(12) United States Patent
Gaither et al.

(10) Patent No.: US 10,665,127 B2
(45) Date of Patent: May 26, 2020

(54) SYSTEMS AND METHODS FOR SHARING DRIVER COACHING DATA

(71) Applicant: Toyota Motor Engineering & Manufacturing North America, Inc., Plano, TX (US)

(72) Inventors: Geoffrey D. Gaither, Brighton, MI (US); Joshua D. Payne, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 95 days.

(21) Appl. No.: 15/824,985

(22) Filed: Nov. 28, 2017

(65) Prior Publication Data
US 2019/0164451 A1    May 30, 2019

(51) Int. Cl.
*G09B 19/16*    (2006.01)
*B60W 40/09*    (2012.01)
(Continued)

(52) U.S. Cl.
CPC ..... *G09B 19/167* (2013.01); *B60W 30/18127* (2013.01); *B60W 40/06* (2013.01); *B60W 40/09* (2013.01); *B60W 50/14* (2013.01); *H04W 4/38* (2018.02); *H04W 4/48* (2018.02); *H04W 4/70* (2018.02); *B60W 2050/0077* (2013.01);
(Continued)

(58) Field of Classification Search
CPC ...... G09B 19/167; H04W 4/70; H04W 4/046; H04W 4/48; H04W 4/38; H04W 4/02; B60W 40/06; B60W 40/09; B60W 30/18127; B60W 2550/402;
(Continued)

(56) References Cited

U.S. PATENT DOCUMENTS 6,314,365 B1 *   11/2001   Smith ................... G01C 21/30
                                                340/988
6,321,161 B1 *   11/2001   Herbst ............... G01C 21/3415
                                                340/905
(Continued)

FOREIGN PATENT DOCUMENTS

WO     2017017494     2/2017

OTHER PUBLICATIONS

BMW ConnectedDrive; https://www.youtube.com/watch?v=r1ORFGGfykw; dated Dec. 8, 2011.
(Continued)

*Primary Examiner* — Russell Frejd
(74) *Attorney, Agent, or Firm* — Sheppard, Mullin, Richter & Hampton LLP; Daniel N. Yannuzzi; Hector A. Agdeppa

(57) ABSTRACT

Systems and methods of sharing driver coaching data are provided. Driver coaching systems learn the characteristics of a deceleration event. With the goal of increasing recouped energy while operating a vehicle that can recapture energy in a battery, driver coaching systems predict when the vehicle can begin coasting at the start of the deceleration event. In this way, the amount of time during which regenerative braking can be applied may be increased. Coaching cues are provided to the driver so that the vehicle can be operated in a way that achieves the goal of increasing recouped energy. By sharing driver coaching data, the amount of learning time/resources spent by other vehicles can be reduced.

19 Claims, 11 Drawing Sheets

(51) Int. Cl.
  *B60W 40/06* (2012.01)
  *H04W 4/70* (2018.01)
  *H04W 4/48* (2018.01)
  *H04W 4/38* (2018.01)
  *B60W 50/14* (2020.01)
  *B60W 30/18* (2012.01)
  *H04W 4/02* (2018.01)
  *B60W 50/00* (2006.01)

(52) U.S. Cl.
  CPC .............. *B60W 2050/0089* (2013.01); *B60W 2550/402* (2013.01); *H04W 4/02* (2013.01)

(58) Field of Classification Search
  CPC . B60W 2050/0089; B60W 2050/0077; B60W 50/14
  See application file for complete search history.

(56) References Cited

U.S. PATENT DOCUMENTS

| | | | |
|---|---|---|---|
| 8,897,999 B2 * | 11/2014 | Takeuchi | G01C 21/32 701/123 |
| 8,996,290 B2 * | 3/2015 | Robl | G07C 5/008 701/123 |
| 9,229,905 B1 | 1/2016 | Penilla | |
| 9,463,806 B2 | 10/2016 | Rebhan | |
| 9,547,989 B2 | 1/2017 | Fairfield | |
| 9,613,466 B1 * | 4/2017 | Bullock | G01S 19/14 |
| 2007/0038345 A1 | 2/2007 | Heider | |
| 2007/0143002 A1 * | 6/2007 | Crowell | G07C 5/004 701/123 |
| 2008/0297335 A1 | 12/2008 | Yeh | |
| 2011/0313656 A1 * | 12/2011 | Mignen | G01C 21/26 701/420 |
| 2012/0283893 A1 | 11/2012 | Lee | |
| 2016/0026182 A1 | 1/2016 | Boroditsky | |
| 2016/0171521 A1 * | 6/2016 | Ramirez | G06Q 30/0224 701/409 |
| 2017/0061825 A1 | 3/2017 | Payne | |
| 2017/0174221 A1 | 6/2017 | Vaughn | |
| 2017/0305434 A1 * | 10/2017 | Ratnasingam | B60W 40/09 |
| 2017/0336801 A1 * | 11/2017 | Shashua | G01C 21/32 |

OTHER PUBLICATIONS

John Beltz Snyder; New Tesla Features Make Car Sharin Easier; https://www.autoblog.com/2017/08/21/new-tesla-model-3-features-carsharing-smartphone-app-key-card/ , Aug. 21, 2017.

* cited by examiner

SYSTEMS AND METHODS FOR SHARING DRIVER COACHING DATA

TECHNICAL FIELD

The disclosed technology relates generally to automotive systems and technologies, and more particularly, some embodiments relate to driver coaching to increase efficiency during deceleration events, and sharing data associated with the driver coaching.

DESCRIPTION OF THE RELATED ART

Many drivers are proficient at driving a vehicle. Drivers often operate vehicles, such as automobiles, on a daily basis, e.g., driving to and from work, driving to and from stores to run errands. Many drivers travel long distances in automobiles, such as when taking a road trip on a vacation.

Hybrid electric vehicles (HEVs) have become increasingly popular among drivers concerned with their environmental impact and with increasing fuel economy. HEVs generally utilize an internal combustion engine (ICE) in conjunction with an electric motor, also referred to as a motor generator (MG). HEVs can achieve better fuel economy over a conventional (ICE-only) vehicle because the need for fossil fuel, e.g., gasoline, is reduced. HEVs also help reduce the carbon footprint of an individual by lessening the creation of toxic byproducts normally generated when operating a conventional fossil-fuel-powered vehicle. An HEVs electric motor can be powered by a battery, which requires recharging. In HEVs, a controller can monitor a battery state of charge (SOC) and/or battery residual charge to determine when to recharge the battery, as well as determine when to switch from utilizing its ICE to utilizing its electric motor and vice versa.

Despite drivers being proficient at driving theft vehicles, and despite the popularity of HEVs, other ways of achieving energy efficiency with respect to vehicles have yet to be taken advantage of.

BRIEF SUMMARY OF EMBODIMENTS

In accordance with one embodiment, a computer-implemented method, comprises obtaining driver coaching data associated with a driver navigating a road feature while operating a first vehicle. The method further comprises correlating the driver coaching data with a location of the road feature upon being approached or navigated by a second vehicle. Further still, the method comprises implementing a driver coaching function in the second vehicle using the driver coaching data associated with first driver upon the second vehicle approaching or navigating the road feature.

In some embodiments, the driver coaching data comprises at least one of data characterizing the road feature, data identifying the location of the road feature, and the driver's operation of the first vehicle at the location. Driver coaching data may also comprise estimated operating efficiency associated with future implementation of the driver coaching function based on the driver coaching data. In some embodiments, the future implementation of the driver coaching function based on the driver coaching data comprises implementing a maximum possible amount of regenerative braking during a deceleration aspect of navigating the road feature.

In some embodiments, the driver operating the first vehicle is the same as that operating the second vehicle. In some embodiments, the driver operating the first vehicle is different from a driver operating the second vehicle. In some embodiments, the correlating of the driver coaching data with the location comprises detecting the location of the second vehicle, and analyzing the driver coaching data for information identifying the location.

In some embodiments, the implementation of the driver coaching function in the second vehicle comprises presenting one or more coaching cues to a driver operating the second vehicle. The coaching cues can suggest release of the second vehicle's accelerator pedal to begin coasting.

The obtaining of the driver coaching data may comprise downloading the driver coaching data from a cloud-based datastore, or downloading the driver coaching data from a fleet datastore. The first and second vehicles may belong to the same fleet. The driver coaching data can be received from a memory unit of the first vehicle. In some embodiments, the driver coaching data is directly received from the memory unit or received from an intermediate, roadside unit in communication with the first and second vehicles.

In accordance with another embodiment, a computer-implemented method may comprise obtaining driver coaching data associated with a driver navigating a road feature while operating a first vehicle. The driver coaching data can be correlated with a location of the road feature upon being approached or navigated by a second vehicle. Estimated operating efficiency associated with predicted implementation of a driver coaching function in the first vehicle based on the driver coaching data can be compared. The comparison can be made in view of measured operating efficiency associated with previous operation of the second vehicle approaching or navigating the road feature. The driver coaching function in the second vehicle using the driver coaching data can be implemented upon a future instance of the second vehicle approaching or navigating the road feature. This is done only if the estimated efficiency of the first vehicle is greater than the measured operating efficiency of the second vehicle.

The predicted implementation of the driver coaching function based on the driver coaching data includes predicted implementation of a maximum possible amount of regenerative braking during one or more portions of the road feature where deceleration is needed. The implementation of the driver coaching function in the second vehicle comprises presenting one or more coaching cues suggesting a release of the second vehicle's accelerator pedal to induce coasting at which time the regenerative braking is initiated.

The measured operating efficiency associated with the previous operation of the second vehicle is based on portions of the road feature during which deceleration and acceleration are needed. Regenerative braking is not applied during the portions of deceleration. In some embodiments, the computer-implemented method comprises one of temporarily disabling the driver coaching function. It may further comprise overriding the driver coaching function upon a determination that the measured operating efficiency of the second vehicle is greater that the estimated operating efficiency of the first vehicle.

The temporary disabling of the driver coaching function may comprise temporarily disabling at least one of information collection and derivation, the collected and derived information comprising the driver coaching data. The overriding of the driver coaching function may comprise prohibiting presentation of coaching cues. The implementation of the driver coaching function in the second vehicle may comprise normalizing the driver coaching data for use with the second vehicle.

The implementation of the driver coaching function in the second vehicle may comprise normalizing the driver coaching data for use with the second vehicle. The driver coaching data comprises information characterizing a preferred distance from the road feature at which to begin coasting.

In accordance with another embodiment, a computer-implemented method comprises obtaining driver coaching data associated with a first driver operating a vehicle. The method further comprises correlating the driver coaching data with a location of the road feature upon being approached or navigated by the vehicle as it is being operated by a second driver. A driver coaching function in the vehicle using the driver coaching data associated with the first driver is implemented upon the vehicle approaching or navigating the road feature as it is being operated by the second driver.

The driver coaching data associated with the first driver is maintained as a driver coaching data profile retrievable by the first or second driver.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1A:
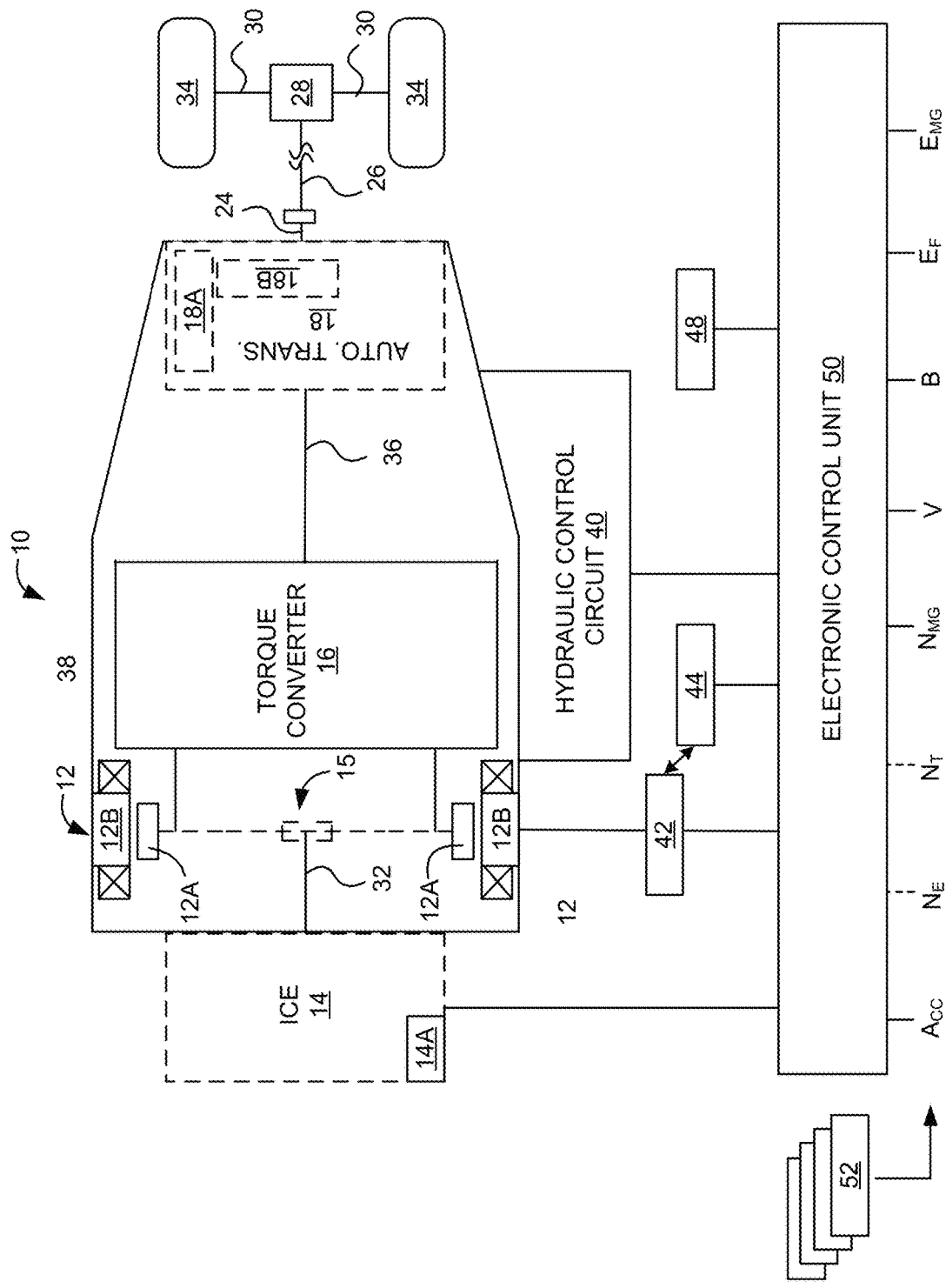
FIG. 1A illustrates an example of a vehicle with which systems and methods for driver coaching can be implemented in accordance with one embodiment of the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed towards systems and methods for sharing driver coaching or assistance data. A driver coaching system can monitor a driver's behavior relative to a road feature, such as when the driver is approaching a stop, turn, a change in road grade, etc. Over time, the driver coaching system learns where/when a driver is likely to decelerate relative to the road feature. Based on this, the driver coaching system can expand the time during which regenerative braking is applied, and may suggest to the driver (through coaching cues) when the accelerator pedal should be released so that a period of expanded regenerative braking may be applied. Regenerative braking can be applied to aid in deceleration and recharge the vehicle's battery. In this way, a stop/deceleration event may be leveraged (to its fullest extent) as an opportunity to regain energy, not to mention save energy that might be wasted through friction braking. Some driver coaching systems are also able to consider the operating efficiency of a vehicle based on the driver's own manner of operation, i.e., without any driver coaching. In this case, driver coaching can be selectively implemented, e.g., only used when the operating efficiency of the vehicle using driver coaching exceeds the operating efficiency of the vehicle when a driver operates the vehicle without being coached.

However, conventional vehicles do not allow driver coaching data to be shared, either between vehicles operated by the same driver, between vehicles in a fleet, between different drivers of different vehicles, etc. For example, if a driver switches vehicles, the driver coaching system must re-learn and re-analyze the driver's behavior in order to generate coaching cues. In the case of selective driver coaching, the driver coaching system must re-learn whether or not driver coaching should be applied, etc. This can be time-consuming and can tie up processing resources. Moreover, other vehicles are deprived of the chance to increase their operating efficiency unless they go through the entire process of learning and/or performing an operating efficiency analysis on their own. Accordingly, various embodiments of the present disclosure provide different ways in which driver coaching data may be shared. This way, driver coaching may be implemented more quickly when warranted, resulting in even more energy savings for the same or even other vehicles.

Driver coaching in accordance with various embodiments may be controlled by a driver coaching circuit implemented in or as part of a vehicle's electronic control unit. The driver coaching circuit can receive or derive data from one or more sensors that characterize the operating efficiency of the vehicle being driven in order to generate cues that help a driver operative the vehicle more efficiently. In those cases where driver coaching is selective, the driver coaching circuit may also decide whether or not to coach the driver. Datastores in which driver coaching data, vehicle and/or driver profiles, etc. can be stored may be implemented locally on a vehicle or remotely, (e.g., on a cloud-based datastore). The stored driver coaching data may then be shared with other drivers and/or vehicles that have access to those datastores. It should be noted that although certain embodiments are described in the context of HEVs, various embodiments of the systems and methods described herein can be adapted for use in any vehicle with a battery/batteries capable of recapturing energy. Accordingly, the systems and methods described herein can be used in electric vehicles, fuel cell vehicles, etc.

An example HEV in which driver coaching may be implemented is illustrated in FIG. 1A. FIG. 1A illustrates a drive system of a hybrid electric vehicle 10 that may include an internal combustion engine 14 and one or more electric motors 12 as sources of motive power. Driving force generated by the internal combustion engine 14 and motor 12 can be transmitted to one or more wheels 34 via a torque converter 16, a transmission 18, a differential gear device 28, and a pair of axles 30.

As an HEV, vehicle 10 may be driven/powered with either or both of engine 14 and the motor(s) 12 as the drive source for travel. For example, a first travel mode may be an engine-only travel mode that only uses ICE 14 as the drive source for travel. A second travel mode may be an EV travel mode that only uses the motor(s) 12 as the drive source for travel. A third travel mode may be an HEV travel mode that uses engine 14 and the motor(s) 12 as drive sources for travel. In the engine-only and HEV travel modes, vehicle 10 relies on the motive force generated at least by ICE 14, and a clutch 15 may be included to engage engine 14. In the EV travel mode, vehicle 10 is powered by the motive force generated by motor 12 while engine 14 may be stopped and clutch 15 disengaged.

Engine 14 can be an internal combustion engine such as a gasoline, diesel or similarly powered engine in which fuel is injected into and combusted in a combustion chamber. An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 12 can also be used to provide motive power in vehicle 10, and is powered electrically via a power storage device 44. Motor 12 can be powered by power storage device 44 to generate a motive force to move the vehicle and adjust vehicle speed. Motor 12 can also function as a generator to generate electrical power such as, for example, when coasting or braking. Power storage device 44 may also be used to power other electrical or electronic systems in the vehicle. Motor 12 may be connected to power storage device 44 via an inverter 42. Power storage device 44 can include, for example, one or more batteries, capacitive storage units, or other storage reservoirs suitable for storing electrical energy that can be used to power one or more motors 12.

When power storage device 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motors and adjust the current received from motors 12 during regenerative coasting and breaking. As a more particular example, output torque of the motor 12 can be increased or decreased by electronic control unit 50 through the inverter 42.

A torque converter 16 can be included to control the application of power from engine 14 and motors 12 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motors 12 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1A, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of ICE 14 (engine RPM), a rotational speed, $N_{MG}$, of the motor 12 (motor rotational speed), and vehicle speed, $N_V$. These may also include torque converter 16 output, $N_T$ (e.g., output amps indicative of motor output), brake operation amount, B, battery SOC (i.e., the charged amount for battery 44 detected by an SOC sensor). Accordingly, vehicle 10 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (ICE 14+motor 12) efficiency, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensor 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 1B:
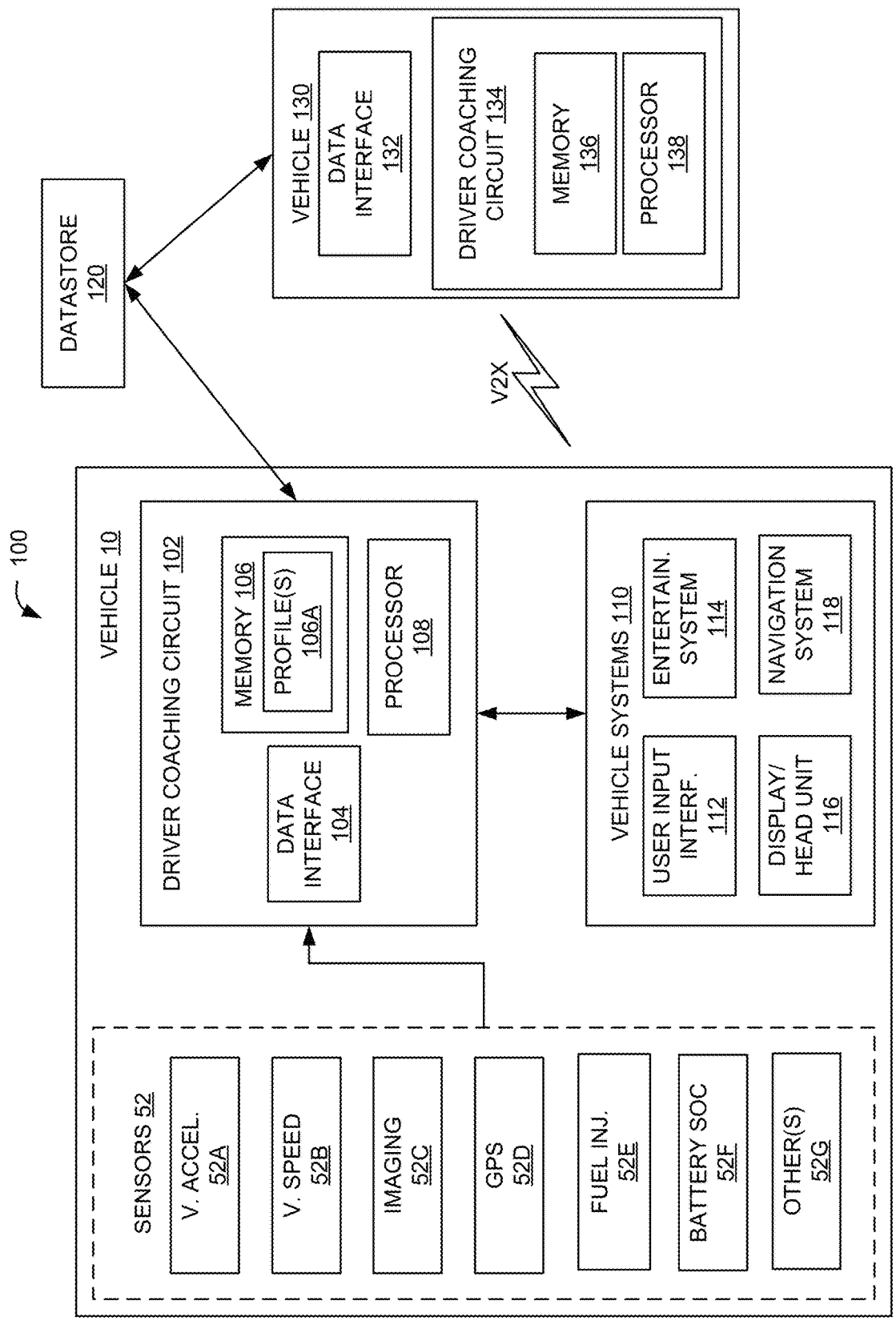
FIG. 1B illustrates an example architecture for implementing driver coaching in the vehicle of FIG. 1A and sharing driver coaching data.

FIG. 1B is a diagram illustrating an example of a driver coaching system that can share driver coaching data in accordance with one embodiment of the present disclosure. In this example, system 100 includes a driver coaching circuit 100, a plurality of sensors 52A-G, and a plurality of vehicle systems 110. Sensors 52A-G and vehicle systems 110 can communicate with driver coaching circuit 102 via a wired or wireless communication interface. Although sensors 52A-G and vehicle systems 110 are depicted as communicating with driver coaching circuit 102, they can also communicate with each other as well as with other vehicle systems. Driver coaching circuit 102 can be implemented as a standalone electronic control unit or as part of an electronic control unit such as, for example electronic control unit 50.

Driver coaching circuit 102 in this example includes a data interface 104, a memory 106, and a processor 108. Components of driver coaching circuit 102 may communicate with each other via a data bus, although other communication interfaces can be included.

Processor 108 may be a GPU, CPU, microprocessor, or any other suitable processing system. The memory 106 may include one or more various forms of memory or data storage (e.g., flash, RAM, etc.) that may be used to store the calibration parameters, images (analysis or historic), point parameters, instructions and variables for processor 108 as well as any other suitable information. Memory 106 can be made up of one or more modules of one or more different types of memory, and may be configured to store data and other information as well as operational instructions that may be used by the processor 108 to control driver coaching circuit 102.

Although the example of FIG. 1B is illustrated using processor and memory circuitry, as described below with reference to circuits disclosed herein, driver coaching circuit 102 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a driver coaching circuit.

Data interface 104 can be either a wireless communications/processing interface or a wired communications/processing interface with an associated hardwired data port (not illustrated). As this example illustrates, communications with driver coaching circuit 102 can include either or both wired and wireless communications. A wireless data interface can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise.

A wired data interface can include a transmitter and a receiver (not shown) for hardwired communications with other devices, e.g., a hardwired interface to other components, including sensors 52A-G and vehicle systems 110. A wired data interface can communicate with other devices using Ethernet or any of a number of other wired communication protocols whether standardized, proprietary, open, point-to-point, networked or otherwise.

Data interface 104 can be used to transmit and receive data between driver coaching circuit 102 and sensors 52A-G, as well as between driver coaching circuit 102 and vehicle systems 110. For example, data interface 104 can be configured to receive data and other information from, e.g., vehicle acceleration sensor 52A. This sensor data can be used to determine the rate of acceleration (or deceleration) vehicle 10 may be experiencing. Data interface 104 may also receive information associated with a particular location vehicle 10 is traversing from GPS receiver 52D. Data interface 104 may further receive information that directly or indirectly reflects vehicle 10's operating efficiency, e.g., battery SOC, fuel consumption, etc.

Sensors 52A-G may be example embodiments of sensors 52 illustrated in FIG. 1A. Sensors 52A-G can include one or more of the above-mentioned sensors and/or other sensors capable of sensing vehicle operating conditions that may be used to decide whether or not to implement driver coaching or defer to driver-controlled vehicle operation. It should be understood that not all the illustrated sensors are necessarily needed, and that additional sensors (other sensor(s) 52G) may be used.

For example, battery SOC information from SOC sensor 52F can be correlated with one or more of a deceleration and acceleration event (determined from vehicle acceleration sensor 52A) and the location at which the event occurred. The location can be determined by, e.g., GPS sensor 52D. In this way, the amount of energy gained/lost (based on battery SOC) during a particular driving event can be determined. As another example, the amount of fuel injected into ICE 14 can be received by data interface 104 from fuel injection sensor 52E. The amount of fuel used during an acceleration/deceleration event sensed by vehicle acceleration sensor 52A (and the location at which it occurred determined by GPS sensor 52D) can be used to determine fuel efficiency.

In some embodiments, an imaging sensor 52C, such as a camera may be used to visually determine vehicle 10 is approaching or traversing a turn. Navigating a turn is one example of a driving events during which driver-controlled operation of a vehicle can result in greater overall efficiency compared to that achieved with driver-coached operation of a vehicle. This is because the vehicle reaccelerates after exiting the turn. A driver coaching system that does not consider the need to reaccelerate only focuses on deceleration through regenerative braking. That is, a driver may be coached to release the vehicle's accelerator pedal as soon as possible prior to the turn, allowing regenerative braking to occur for as long as possible. However, this may result in a speed reduction so great that the energy needed for reacceleration negates or even exceeds the energy recouped or regained through regenerative braking. In this scenario, it would more beneficial for overall operating efficiency (deceleration and reacceleration) to allow the driver to operate the vehicle in his/her normal manner of operation. If, however, the driver does not operate the vehicle in a manner that results in, e.g., greater overall operating efficiency, the driver coaching system may still be allowed to coach the driver.

It should be noted a stop event, e.g., coming to and stopping completely at a stop sign requires reacceleration from a zero-speed condition. Thus, It is unlikely (although still possible) that driver-controlled operation of a vehicle results in better overall operating efficiency than driver-coached operation of the vehicle in such a scenario.

In some embodiments, other sensors may be used to provide data that can be used in a calculation or comparison operation to determine whether or not driver coaching should be enabled, provide coaching advice, etc. For example, a vehicle speed sensor 52B may be configured to determine the speed at which vehicle 10 is traveling. In some embodiments, vehicle speed sensor 52B may be a sensor configured to determine the number of revolutions one or more wheels (e.g., wheels 34) are turning over some period of time. This number of revolutions may be translated into vehicle speed through one or more known calculations that may be performed on vehicle speed sensor 52B or that may be performed by processor 108. In some embodiments, vehicle speed sensor 52B may be a radar, sonar, or other device that uses, e.g., the Doppler effect, to determine the speed at which vehicle 10 is traveling. For example, a radar may be used to transmit a beam to a roadside object, such as a traffic sign, and the speed of vehicle 10 can be determined based upon the change in frequency of the beam upon bouncing back from the roadside object.

Vehicle speed may be used as a parameter in judging operating efficiency of a vehicle. For example, as alluded to above, the decision to coach a driver can depend on the need to reaccelerate after or upon exiting a turn. The operating efficiency of a vehicle can be determined based upon a particular vehicle speed, e.g., cruising speed, at which time, the need to reaccelerate ends. In other words, a certain vehicle speed can be a boundary of a measurement of the overall operating efficiency of a vehicle.

In some embodiments, a GPS sensor (which may be a GPS receiver) 52D can be used to determine the location of vehicle 10 at some point in time. Based on a subsequent location to which vehicle 10 has traveled and the time it took for vehicle 10 to traverse the distance to the subsequent location can be used to determine its speed. Again, GPS sensor 52D may have the capability to perform this speed calculation, or the locations data alone may be transmitted to processor 108 to be translated into vehicle speed data. In some embodiments GPS sensor 52D may communicate with one or more location-based systems, navigation information providers, and the like to receive location information that can ultimately be used to calculate the speed at which vehicle 10 is traveling. It should be understood that although other types of sensors/receivers operable in other types or forms of positioning/location systems, e.g., GLONASS, GALILEO, BEIDOU, etc.

In still other embodiments, vehicle 10 may communicate with roadside units of a vehicle-to-infrastructure (V2I) communications system or one or more other vehicles (V2V communications) (both referred to as V2X communications) to determine and/or receive information indicative of the speed at which it is traveling. These V2X communications may occur between one or more roadside units and/or one or more other vehicles. They can be received directly by driver coaching circuit 102 or another electronic control unit or other communications component of vehicle 10 (and forwarded to driver coaching circuit 102 via data interface 104).

As noted previously, operating efficiency can be determined based on the amount of power consumed from battery 44 and/or the amount of fuel used over a particular driving event, such as a stop or turn. GPS sensor 52D can be used to determine where that stop or turn occurs so that over time, driver coaching circuit 102 can learn how much battery power and/or fuel is used during deceleration and reacceleration for that driving event. The location of vehicle 10 can be used to determine where the driver coaching system should provide deceleration advice (e.g., when/where the driver should release the accelerator pedal to begin coasting at which time, regenerative braking can be applied).

Driver coaching circuit 102 may receive the aforementioned sensor or sensor-derived information regarding vehicle 10's location, any acceleration/deceleration events that occur at vehicle 10's location, as well as vehicle 10's operating efficiency. From this information, driver coaching circuit 102 can learn when, where, and/or whether a driver of vehicle 10 can be coached to operate vehicle 10 more efficiently. Driver coaching circuit 102 may store this driver coaching data that it learns in memory 106. In some embodiments, driver coaching circuit 102 may also store the driver coaching data in another memory, such as a remote datastore 120. In some embodiments, processor 108 causes the driver coaching data to be uploaded to datastore 120 via its data interface 104. The driver coaching data may be periodically or aperiodically uploaded to another memory, such as datastore 120. For example, driver coaching data may be uploaded in accordance with a determined schedule or may be uploaded, e.g., whenever memory new/updated driver coaching data is stored in memory 106.

Driver coaching circuit 102 can also compare the driver-coached operating efficiency of vehicle 10 (through deceleration) to the driver-controlled operating efficiency of vehicle 10 (through deceleration and reacceleration). Based on this comparison, driver coaching circuit 102 may or may not provide coaching advice to the driver of vehicle 10. It should be noted that in some embodiments, driver coaching circuit 102 may process the sensor or sensor-derived information and calculate the operating efficiency of vehicle 10 under various circumstances.

For example, location information regarding vehicle 10 may be received by driver coaching circuit 102 via data interface 104 from GPS sensor 52D. This location information may be stored in memory 106. At the same time, driver coaching circuit 102 may receive deceleration/reacceleration information indicating the amount of deceleration/reacceleration vehicle 10 is experiencing at that location. This deceleration/reacceleration information may also be stored in memory 106 and correlated with the location information. This collection of information can occur over some determined time period, for some number of repetitions, etc. For example, driver coaching circuit 102 may store information characterizing the deceleration event at the same location for five occurrences. Based on this stored information, processor 108 may determine that vehicle 10 is approaching a turn during which the driver operates vehicle 10 in such a way that it decelerates by some average amount before reaccelerating.

It should be noted that location information can also be determined based on querying a navigation system 118. Navigation system 118 may operate in conjunction with GPS sensor 52D and/or receive location or navigation information from a third party provider via V2X communications, radio communications, etc. For example, based on route information input into navigation system 118, driver coaching circuit 102 may determine that vehicle 10 is traveling a route that involves navigating a turn. When GPS sensor 52D indicates that vehicle 10 is nearing the turn, driver coaching circuit 102 may begin querying the relevant sensors 52 to determine vehicle acceleration, vehicle speed, fuel consumption, etc. This collection of sensor data can occur until GPS sensor 52D indicates that vehicle 10 has navigated the turn.

The collected sensor data can be analyzed by processor 108 to determine the manner in which the driver of vehicle 10 is negotiating the turn, and in particular, how efficient he/she is operating vehicle 10. That is, processor 108 can determine how much vehicle 10 decelerates leading up to and throughout the turn. Based on this information, processor 108 may perform one or more calculations to determine whether energy can be recaptured during deceleration, i.e., when the accelerator pedal is not being actuated by the driver. If so, processor 108 may determine when the driver should release the accelerator pedal so that vehicle 10 can coast, and regenerative braking can be applied to decelerate vehicle 10 without using friction braking (that consumes energy), and recapture energy. Examples of driver coaching systems that provide coaching advice include those disclosed in commonly-assigned U.S. Pat. Nos. 8,862,342 and 9,202,378, as well as U.S. Patent Publication Nos. 2017/0088049 and 2017/0061825, each of which are incorporated herein by reference in their entirety. Any one or more of these systems and methods of providing driver coaching may be used to effectuate the driver coaching functionality disclosed herein. In some embodiments, these may then be augmented by allowing driver coaching to be selectively applied.

In addition, and although the driver coaching circuit 102 provides coaching advice based on operating efficiency information throughout deceleration, reacceleration information is also recorded. This reacceleration information comprises the amount of reacceleration that occurs, as well the energy (fuel or battery power) needed to power vehicle 10 to achieve the desired reacceleration. In this way, processor 108 may compare the operating efficiency, e.g., fuel or battery power consumed, during deceleration at a certain location of vehicle 10 when driving in accordance with driver coaching advice. That is, processor 108 may estimate, through one or more calculations, the amount of energy that can be recouped through regenerative braking. This can be subtracted from the amount of energy consumed through driver-controlled operation of vehicle 10 (i.e., the energy consumption information obtained through driver coaching circuit 102's learning process described above). The result is an estimate of how efficiently vehicle 10 can be operated in a driver-coached manner. For example, fuel economy may benefit from an overall reduction in the energy used to maintain vehicle speed because less deceleration results in less reacceleration needed, which in turn results in less overall fuel being consumed. In HEVs, the ICE, e.g., ICE 14 of vehicle 10 are used during acceleration as ICE 14 can provide more power and/or add to the power of motor 12.

As noted above, the overall operating efficiency associated with driver-controlled operation of vehicle 10 is determined by learning how much energy is consumed during deceleration as well as reacceleration up to some determined vehicle speed, e.g., cruising speed. Alternatively, the amount of energy consumed can determined up to a point where vehicle 10 is no longer accelerating.

Processor 108 can also estimate the amount of energy that would be consumed by reaccelerating to the determined vehicle speed/when acceleration is no longer needed after the driver coached deceleration. In this way, the overall energy consumption/operating efficiency in driver-controlled and driver-coached conditions can be determined. Processor 108 may then compare the respective overall operating efficiencies of driver-controller operation and driver-coached operation. This can be done prior to providing driver coaching advice so that processor 108 can determine whether or not to continue with providing the coaching advice or without the coaching advice. In some embodiments, this determination is incorporated as part of the driver coaching learning process (rather than used to augment driver coaching systems that are based solely on deceleration operating efficiency). Accordingly, this comparison may be performed prior to generating any driver coaching advice. Only after it is determined that driver-coached operation is more efficient that driver-controlled operation is driver coaching advice generated and provided.

It should be noted that the aforementioned driver coaching data that is stored, e.g., in memory 106 and/or datastore 120, may include data indicative of the driver-controlled operating efficiency. In this way, as will be described below, another vehicle, for example, may be able to compare its own driver-controlled operating efficiency with that of another vehicle, in this case vehicle 10. The comparison may be performed as a way to verify that driver coaching data associated with one vehicle is appropriate for another vehicle. Accordingly, a vehicle (that does not undergo its own learning process) may have some level of confidence in relying on characteristics or operating efficiency data associated with another vehicle.

Memory 106 may be used for "long-term" storage or, e.g., as a buffer or real-time cache used to store relevant sensor or sensor-derived information that processor 108 uses in the manner described herein. For example, memory 106 may be used a long-term storage for the storage of location, operating efficiency, and other information while driver coaching circuit 102 is learning. In other instances, memory 106 may be used as a cache for vehicle 10's real-time deceleration/reacceleration information. For example, during portions of a driving event, sensor or sensor-derived information can be received periodically and summed to arrive at an aggregate operating efficiency that applies to the entire driving event. In some embodiments, memory 106 acts as a cache for driver coaching data that will ultimately be stored in datastore 120 prior to it be transferred to datastore 120.

In the example illustrated in FIG. 1B, vehicle systems 110 include user input interface 112, entertainment system 114, display/head unit 116, and navigation system 118.

User input interface 112 may include one or more user input interfaces such as buttons, knobs, hard keys, soft keys, voice-controlled input, a touch screen element or aspect of display head unit 116, and the like. User input interface 112 allows a user, such as a driver or passenger of vehicle 10 to interact with one or more of vehicle systems 110. For example, as noted above, a driver may input a route into navigation system 115 using user input interface 112, wherein the route information is used by driver coaching circuitry 102 in providing driver coaching advice to the driver. In some embodiments, as noted above, driver coaching circuit 102 may be disabled in favor of driver-controlled operation of vehicle 10. Accordingly, display/head unit 116 may present a notification to the driver requesting that the driver confirm he/she wishes to allow driver-coached advice to be disabled or overridden.

Entertainment system 114 may include one or more audio-based systems, such as speakers or other devices used to present audio to a driver or passenger(s) of vehicle 10. In some embodiments, entertainment system 114 may be used to provide audible driver-coaching advice to the driver. Entertainment system 114 may include a stereo, radio, media player, and/or other entertainment-related systems or devices. Entertainment system 114 may work in conjunction with display/head unit 116 to present audio-visual notifications to the driver. For example, both visual driver coaching advice can be presented a driver (FIG. 2B) as well as corresponding audible driver coaching advice. It should be understood that there may be multiple displays in vehicle 10 and the presentation of driver coaching advice may occur on different ones of these displays, e.g., a dashboard, a dashboard display, a heads up display, etc.

Figure 2A:
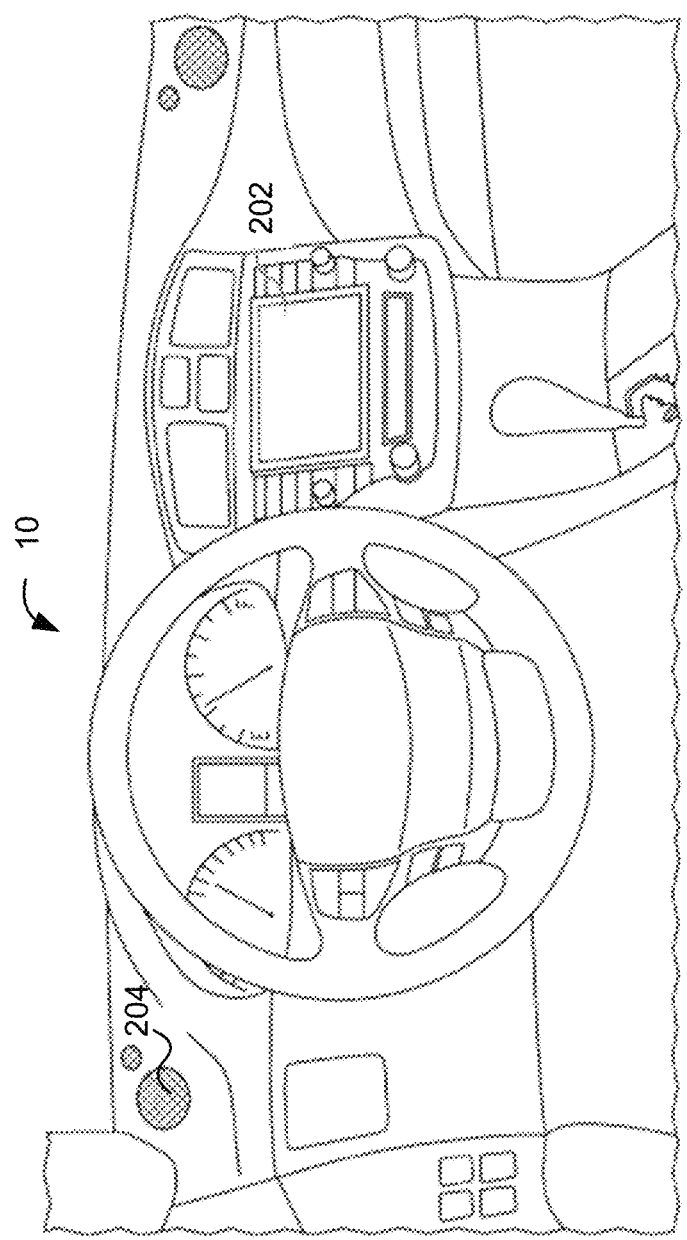
FIG. 2A illustrates an example vehicle interior in which driver coaching can be implemented in accordance with one embodiment of the present disclosure.

FIG. 2A illustrates an interior of a vehicle, e.g., vehicle 10, in which driver coaching in accordance with various embodiments may be implemented. The interior of vehicle 10 may comprise an area in which display/head unit 202 (an embodiment of display/head unit 116) is located. Display/head unit 202 may provide a visual interface to entertainment system 114 and navigation system 118. Moreover, display/head unit 202 may include touchscreen functionality, which may be an embodiment of user input interface 112. Additionally, the interior of vehicle 10 may include and one or more areas in which one or more speakers 204 (which may be a part of entertainment system 114) are located for presenting audio entertainment or information to a driver or passenger(s).

Figure 2B:
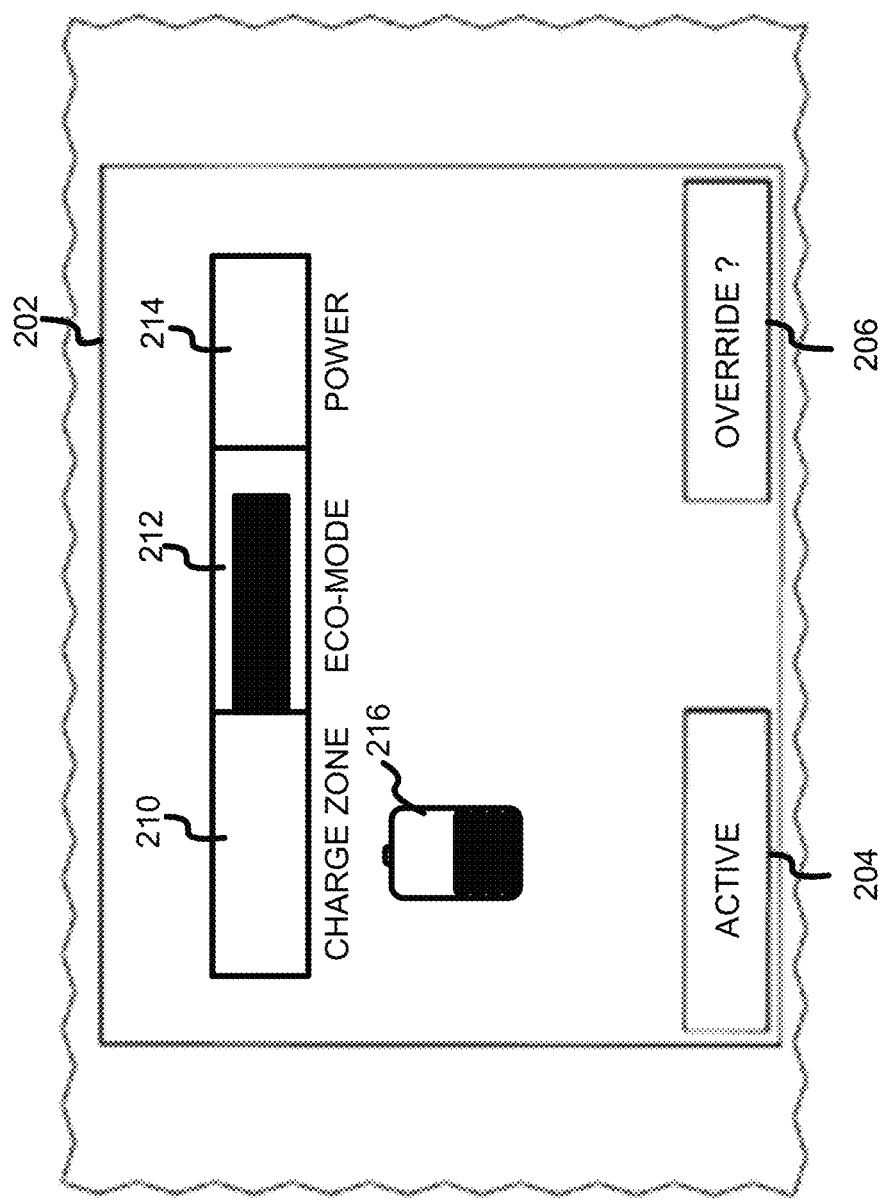
FIG. 2B illustrates an example driver coaching user interface for use in the vehicle interior of FIG. 2A.

FIG. 2B illustrates an example implementation of selective driver coaching in accordance with various embodiments. As illustrated in FIG. 2B, a visual representation of different zones of operating efficiency may be displayed on display/head unit 202. For example, a "charge zone" 210 may be represented. The charge zone can indicate a level of operation during which vehicle 10 is recouping energy. For example, as described above, driver coaching circuit 102, after a learning process, may suggest to a driver that he/she should, upon approaching an upcoming turn, take his/her foot off the accelerator pedal. While the vehicle 10 is coasting, regenerative braking may be applied to decelerate the vehicle 10 as it approaches and/or continues through the turn. During this portion of the driving event, due to regenerative braking, battery 44 is being recharged. Accordingly, a visual representation 216 of battery 44's SOC may also be presented on display/head unit 202.

In addition, an "eco-mode zone" 212 may also be represented on display/head unit 202. The eco-mode zone can indicate a zone of operation during which driver coaching can be applied. For example, a bar 212A can be used to indicate when the driver should (if driver-coached operation is to be followed) release the accelerator pedal of vehicle 10. That is, bar 212A may decrease in size or described another way, "move" towards charge zone 210. The disappearance of bar 212A may be signify to the driver that he/she should release the accelerator pedal. Bar 212A may then progress into the charge zone 210 indicating that vehicle 10 is operating in recouping energy.

A power zone 214 may also be presented on display/head unit 202. Power zone 214 may be used to represent a mode of operation during which a "significant" amount of power is being used by vehicle 10. For example, during reacceleration, bar 212A may move into power zone 214. Upon reaching a cruising vehicle speed or when traveling below a certain vehicle speed, bar 212A may move back into eco-mode zone 212. Depending on the vehicle type, model, engine and/or motor used, along with other variables or parameters, the point at which vehicle 10 is considered to be in power zone can differ.

As alluded to above, a user, such as a driver of vehicle 10 may opt to activate or override driver coaching. Accordingly, display/head unit 202 may also display, in this example, softkeys 204 and 206 that allow the user to activate driver coaching or override it, respectively. In some scenarios, a driver may wish to operate vehicle 10 more aggressively. In this case, the driver may simply wish to disable the learning process of driver coaching circuit 102 altogether because he/she knows this particular trip may be an anomalous driving event. In some embodiments, the activate softkey 204 may be used as a confirmation that a driver wishes to rely on another vehicle's driver coaching data (described below). Likewise, the override softkey 206 may, in some embodiments, be used by a driver to indicate that he/she does not want to rely on suggested coaching cues derived or obtained from another vehicle.

In other embodiments, there may not be a need for this type of user input. For example, based on the above-described comparison of driver-controlled and driver-coached operating efficiency calculations, driver coaching circuit 102 may automatically prohibit learning to be conducted at a particular location, for a particular driving event, etc. That is, driver coaching circuit 102 may be configured to have a learning phase that includes five instances of the same driving event. That is, after five instances, driver coaching circuit 102 may begin providing driver coaching advice to a driver of vehicle 10, e.g., when to coast, at which time regenerative braking is applied. However, driver coaching circuit 102 may continue to obtain or calculate operating efficiency information, and thereby update memory 106. In some instances, this can be done to further refine the driver coaching advice. In those instances where driver-controlled operation of vehicle 10 is more efficient than driver-coached operation of vehicle 10, driver coaching circuit 102 may discontinue collecting information. That is, the location associated with the deceleration event may be tagged or otherwise identified as a location during which learning is not required. In some embodiments, learning may still continue, but driver coaching circuit 102 may discontinue or not provide driver coaching advice.

It should be noted that many different visualizations may be used to represent different states, signify driver coaching advice, etc., and the examples/embodiments illustrated and correspondingly described herein are not meant to be limiting.

Referring back to FIG. 1B, another vehicle, e.g., vehicle 130, may obtain driver coaching data obtained, calculated, and/or otherwise generated by vehicle 10 through its own data interface 132. This can be sensor or sensor-derived data, information characterizing a road feature for which driver coaching may be implemented, location information, operating efficiency information (as discussed above), etc. In some embodiments, as alluded to previously, vehicle 130 may obtain this driver coaching data from datastore 120. In other embodiments, vehicle 130 may receive the driver coaching data from vehicle 10 via, e.g., V2X communications channels.

In some embodiments, the driver coaching data may be stored as a profile associated with the driver of vehicle 10. This can be useful if the driver of vehicle 10 transitions to another vehicle, e.g., vehicle 130, for example, if vehicle 130 is a newly purchased vehicle, a rental vehicle, or other alternative vehicle. Thus, the driver's profile may be ported to driver coaching circuit 134 of vehicle 130. This can also be useful in a selective driver coaching system. That is, driver coaching circuit 134 of vehicle 130 would not need to re-measure the driver-controlled operating efficiency if already provided in the driver coaching data profile obtained from vehicle 10 which would reflect the manner in which the driver would likely operate vehicle 130.

The driver of vehicle 10 may be identified vis-à -vis the driver inputting a PIN, logging into one or more of vehicle systems 110 (discussed below) through user input interface 112. The driver may similarly identify him/herself in vehicle 130. Accordingly, any driver coaching data stored by driver coaching circuit 102 is associated with the identified driver. In some embodiments, the driver may be identified when opening or operating vehicle 10 with a particular key fob. Upon another driver with another key fob opening or operating vehicle 10, driver coaching circuit 102 will store the driver coaching data with the other driver's corresponding profile.

In other embodiments, a profile associated with stored driver coaching data may be a vehicle profile. For example, a driver of vehicle 10 may port the driver coaching data profile of vehicle 10 to vehicle 130 in the event that vehicle 130 is the same or similar, e.g., the same/similar type, brand, model, etc.

The actual transfer of data coaching data from vehicle 10 to vehicle 130 can occur at different times in accordance with different embodiments. In one embodiment, following the example above, a driver coaching data profile associated with a driver may be transferred from one vehicle to another upon the driver logging in or operating a vehicle with a key fob. For example, two family members may share the same vehicle. Each family member may drive, e.g., vehicle 10, which over time, learns that family member's driving habits, routes, etc., which may be stored under a corresponding driver coaching data profile. Each time one of the family members opens or operates vehicle 10 with his/her respective key fob, his/her corresponding driver coaching data profile 106A may be obtained from memory 106 and used as long as he/she is operating vehicle 10. In other embodiments, the driver coaching data profile 106A may have been previously stored in datastore 120. Upon use of the key fob, driver coaching circuit 102 may access datastore 120 and obtain the appropriate driver coaching data profile. When the other family member uses his/her key fob, driver coaching circuit 102 may access datastore 120 for his/her driver coaching data profile.

In still other embodiments, profiles may not be used. That is, obtaining driver coaching data may be contingent upon a particular road feature or location currently being traveled by a vehicle. For example, driver coaching data may be generated based on driver coaching circuit 102 learning about a particular road feature at a particular location. The driver of vehicle 10 may wish to publicly share that driver coaching data. Accordingly, when vehicle 130 (being driven by another driver) detects the road same road feature or comes upon the same location, vehicle 130 may access datastore 120 in real-time or near real-time. Driver coaching circuit 134, through data interface 132, may obtain vehicle 10's driver coaching data associated with that particular road feature and/or location. In other embodiments, driver coaching data relevant to a particular route may be downloaded ahead of a driver operating vehicle 130 (described below).

As alluded to above, the reason for sharing driver coaching data may be to cut down on the learning time needed to improve operating efficiency. Doing so can also leverage the learning performed by one vehicle to positively impact the operating efficiency of another vehicle. For example, if vehicle 10 and vehicle 130 traverse the same or similar route, the driver coaching data associated with vehicle 10 may similarly benefit vehicle 130. Alternatively, a driver may normally operate vehicle 10, but has purchased a new vehicle, e.g., vehicle 130, or vehicle 10 may be temporarily out of commission and vehicle 130 is a rental vehicle. If driver coaching data can lead to increased operating efficiency by providing appropriate coaching cues to the driver of vehicle 10, the same or similar increase in operating efficiency may be achieved by providing appropriate coaching cues to a driver of vehicle 130. It should be understood that in some embodiments, the driver of vehicle 10 is the same as that of vehicle 130, e.g., in the case where the driver has switched to a new vehicle, rental vehicle, etc. However, the driver of vehicle 10 may be different from the driver of vehicle 130, e.g., in the case of vehicles 10 and 130 being driven by two different drives that happen to traverse the same/similar route, and therefore encounter one or more of the same road features.

In some embodiments the coaching cues can be derived by driver coaching circuit 134 of vehicle 130. For example, characteristics of a road feature also traveled by vehicle 130, location information and the like can be obtained by vehicle 130 from memory 106 or datastore 120 and stored in memory 136. Upon vehicle 130 approaching or navigating the road feature or upon detecting its location, processor 138 may parse or analyze the driver coaching data obtained from datastore 120 for related information. For example, processor 138 may search the driver coaching data for a location identifier that corresponds to its detected location. For example, processor 138 may search the driver coaching data for information that corresponds to an approaching road feature detected by vehicle 130 (by one or more of its own sensors) with one traversed by vehicle 10 and reflected in the driver coaching data. For example, a navigation system of vehicle 130 (not shown) may detect or identify road features on a route input by the driver of vehicle 130. Processor 138 may search driver coaching data for any information relevant to the detected or identified road features. Based on relevant information from the driver coaching data obtained from vehicle 10, driver coaching circuit 134 may generate coaching cues for the driver of vehicle 130.

In some embodiments, the coaching cues themselves may be included as part of the coaching data obtained from vehicle 10. This can be especially useful, for example, if vehicle 10 and vehicle 130 belong to a certain fleet of vehicles, e.g., taxi cabs, delivery vehicles, etc. In this case, the driver coaching data associated with vehicle 10 may similarly benefit vehicle 130 which may travel the same route(s) as those traveled by vehicle 10. Moreover, vehicle 10 and vehicle 130 may comprise vehicles that are of the same or a similar make/model, type of vehicle. Thus, any increases or advantages in operating efficiency realized by vehicle 10 may also be realized by vehicle 130 by providing the same coaching cues to the driver of vehicle 130.

Even if the manner in which vehicles 10 and 130 are respectively operated are not exactly the same, but merely similar, vehicle 130 can still benefit by having some baseline information. That is, the driver of vehicle 130 may operative vehicle 130 somewhat more aggressively than the driver of vehicle 10. However, instead of having to learn over, e.g., five instances of experiencing a deceleration event, vehicle 130 may only need two additional instances to fine-tune its coaching cues based on the driver coaching data already learned by vehicle 10. In the case of selective driver coaching, vehicle 130 may use driver-coached operating efficiency information or derive driver-coached operating efficiency information from the driver coaching data obtained from vehicle 10. Driver coaching circuit 134 may perform its own comparison of driver-controlled operating efficiency to driver-coached operating efficiency to determine whether or not coaching cues are enabled or presented, or whether they are disabled or overridden. From a route perspective, leveraging driver coaching data that applies to 8 out of 10 road features (e.g., if a driver of vehicle 10 takes a slightly different route than a driver of vehicle 130 to the same destination), tangible energy savings can be realized.

It should be noted that in the event vehicles 10 and 130 are not similar, e.g., vehicle 10 is a relatively small sedan and vehicle 130 is a larger truck, driver coaching data that is shared between them may be normalized. In one embodiment, a receiving vehicle's driver coaching circuit, e.g., driver coaching circuit 134, upon receiving driver coaching data from vehicle 10, may use a multiplier, weighting, or some other value(s) to make the driver coaching data applicable for a larger vehicle. Doing this can account for, e.g., the longer time it may take for a larger vehicle to decelerate, come to a full stop, etc. For example, the driver coaching data from vehicle 10 may include information reflecting a certain distance from a road feature that vehicle 10 should being coasting (by cueing the driver to release the accelerator pedal. For use with vehicle 130, driver coaching circuit 134 may add to or multiply that distance with some determined value to make it applicable for vehicle 130.

In some embodiments, only certain portions or types of information comprising driver coaching data may be shared. As noted above, driver coaching data can comprise information such as generated coaching cues. When sharing driver coaching data between similar vehicles, coaching cues generated in a first vehicle can be shared with a second, similar vehicle. However, following the above example, coaching cues need not be shared when the first vehicle is small sedan and the second vehicle is larger truck. In this case, the truck may derive its own coaching cues based on information characterizing road feature/location learned by the first vehicle.

In some embodiments, increased operating efficiency may be achieved by sharing driver coaching data regarding, for example, a particular roadway feature, from a plurality of vehicles. Because of the increased amount of driver coaching data, coaching cues, estimated operating efficiency, etc. may be better refined. Moreover, driver coaching data may be used, for example, to populate or update maps or navigations systems (e.g., navigation system 118). That is, the driver coaching data associated with a vehicle, such as vehicle 130, can reflect stops or decelerations associated with non-standard or temporary road features, such as construction areas that necessitate slowed vehicle operation.

Figure 3A:
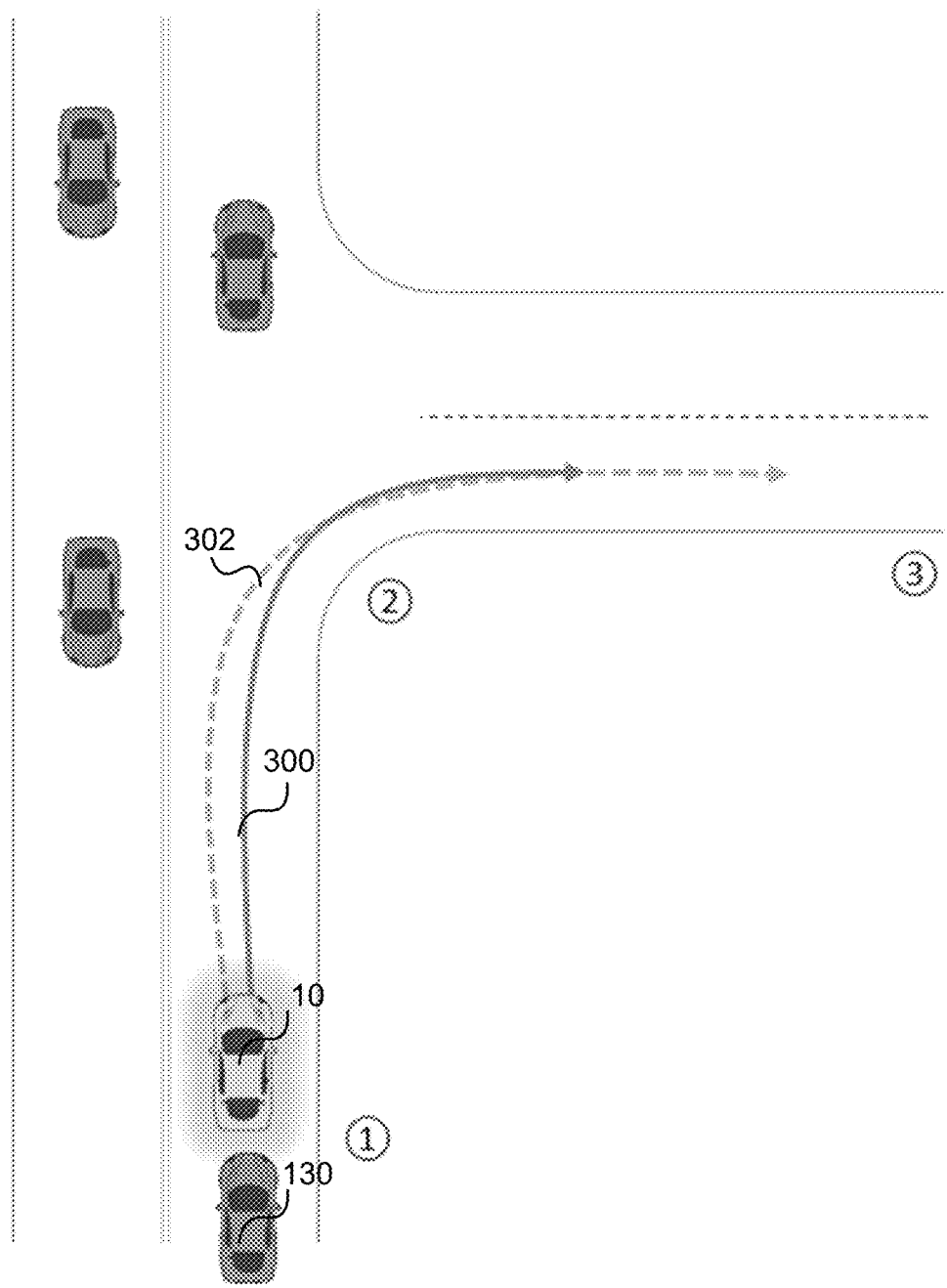
FIG. 3A illustrates an example scenario in which driver coaching in accordance with various embodiments may be used.

FIG. 3A illustrates an example scenario during which selective driver coaching might be beneficial to maintain optimal or improved operating efficiency of a vehicle. The various embodiments effectuating selective driver coaching may be described below with reference to this example scenario. After reading this description, one of ordinary skill in the art will understand how systems and methods for selective driver coaching may be implemented in other vehicle environments and/or may be useful in other scenarios. Some of those scenarios may include, but are not limited to approaching a railroad crossing, passing through an area with speed bumps, traveling over varying road grades (uphill and downhill the transitions between them). Any scenario in which a driver may wish to slow down a vehicle without coming to a complete stop and having a desire to reaccelerate thereafter can benefit.

Figure 3B:
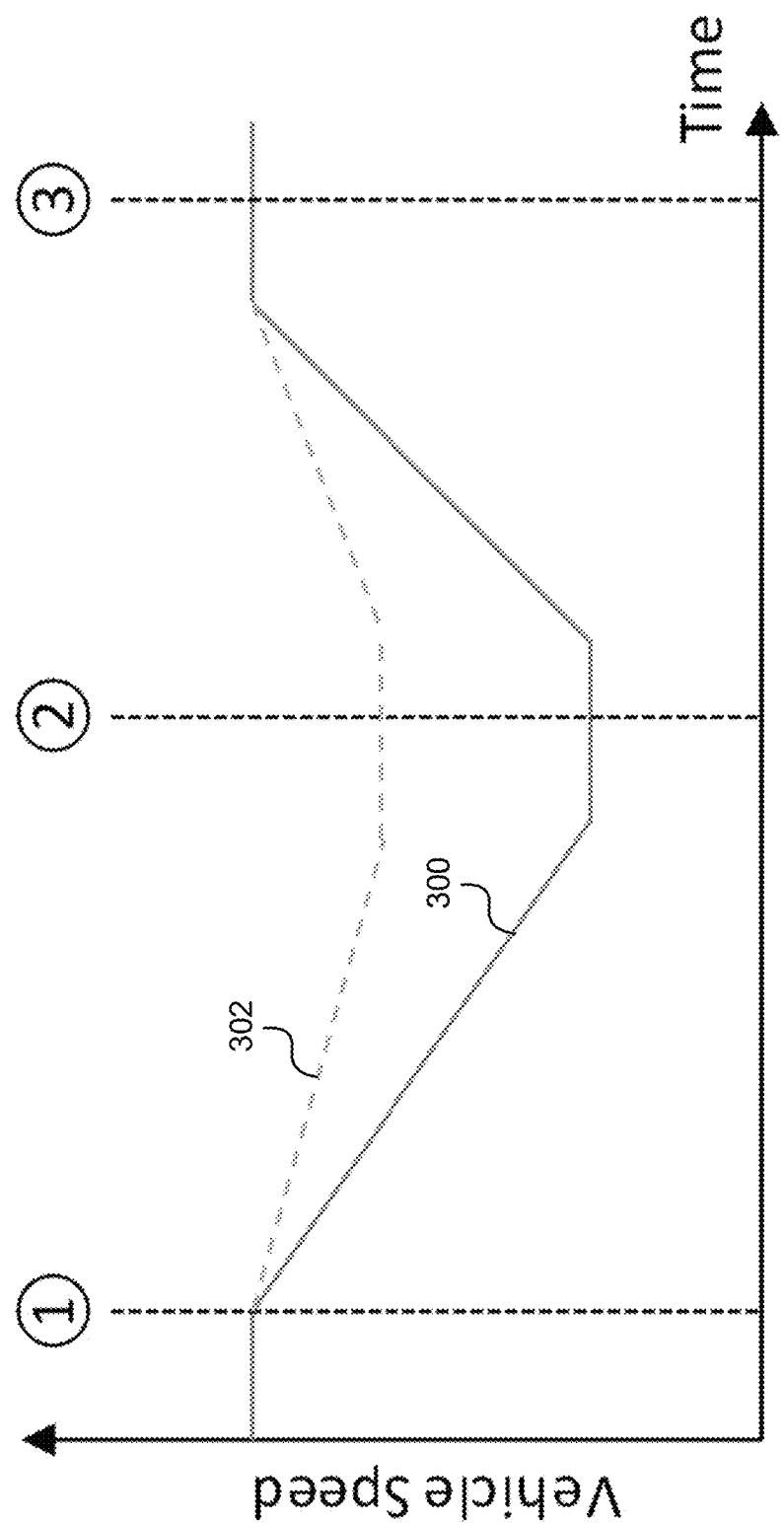
FIG. 3B is an example comparison of driver-controlled operating efficiency and driver-coached operating efficiency.

The example scenario illustrated in FIG. 3A is one in which vehicle 10 may be traveling along a portion of roadway. FIG. 3A will be described in conjunction with FIG. 3B which illustrates corresponding operating efficiency. This particular portion of roadway may include a right turn that vehicle 10 will take/navigate. At a first point/location (1), vehicle 10 is a point during travel when, if driver coaching was enabled, driver coaching circuit 102 would generate driver coaching advice to release the accelerator pedal. This would cause vehicle 10 to coast through the turn at point (2). Referring to FIG. 3B, vehicle 10, until it reaches point (1) may be cruising at some constant vehicle speed. Upon releasing the accelerator pedal at point (1), vehicle 10 begins to decelerate as shown by line 300 indicating vehicle 10's speed over time. Regenerative braking will be applied at point (1) to aid in deceleration and recoup energy. As noted previously, vehicle 10 may coast through the turn at point (2). It can be appreciated that the vehicle 10 may reach its lowest speed just prior to and through the turn at point (2). After vehicle 10 navigates the turn at point (2), driver coaching circuit 102 may provide further driver coaching advice, e.g., advising the driver of vehicle 10 to being reaccelerating until point (3) is reached. At this point, vehicle 10 reaches or returns to its previous (or a new) constant, cruising speed.

However, as previously noted, driver coaching system 102 may provide driver coaching advice based solely on the deceleration of vehicle 10, e.g., through point (1) and until point (2). Thus, the driver of vehicle 10 may, in some cases, operate vehicle 10 with better operating efficiency, e.g., if regenerative braking is not applied at point (1). For example, without driver coaching applied, driver coaching circuit 102 may determine that the driver of vehicle 10 does not slow down as much as if he/she were to follow the coasting advice and regenerative braking were applied. This is seen when comparing line 302 (indicative of vehicle 10's speed over time when controlled by the driver without coaching) to line 300. Moreover, it can be appreciated that because vehicle 10 does not decelerate as much, less power or energy is needed to reaccelerate vehicle 10 after navigating the turn at point (2) until a desired constant, cruising speed at point (3) is reached.

Driver coaching circuit can measure/estimate the overall operating efficiency when vehicle 10 is operated by the driver without driver coaching advice and when vehicle 10 is operated with driver coaching advice. If driver coaching circuit 102 determines that driver-controlled operation is more efficient, driver coaching advice, e.g., in the form of coaching cues, need not be provided to the driver.

Additionally, vehicle 130 may be following vehicle 10, and can benefit from the driver coaching data previously obtained or derived by driver coaching circuit 102 of vehicle 10. In this case, vehicle 10 may communicate with vehicle 130 via V2X communications, and vehicle 130 can request and obtain vehicle 10's relevant driver coaching data, or vehicle 130 can access a remote datastore having vehicle 10's relevant driver coaching data. For example, vehicle 130 may access datastore 120 (FIG. 1B). Vehicle 130 can use or apply the driver coaching data from vehicle 10 as desired and described above. For example, vehicle 130 may use vehicle 10's driver coaching data to obtain an estimated operating efficiency based on driver-coached operation and use that to compare with its own measured, driver-controlled operating efficiency as it navigates turn 2.

Figure 4:
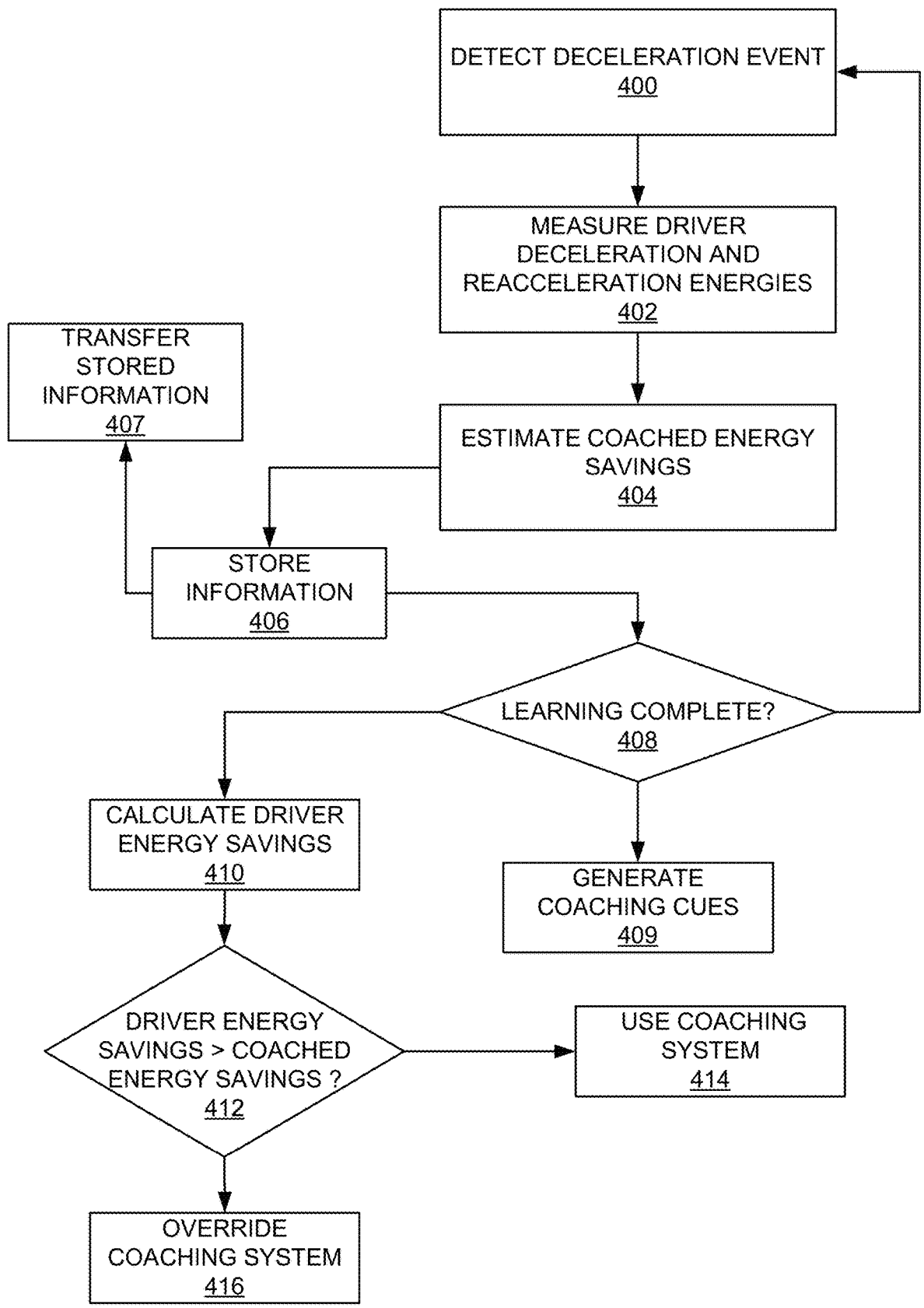
FIG. 4 is a flow chart illustrating example operations that can be performed to achieve driver coaching and driver coaching data sharing in accordance with one embodiment of the present disclosure.

FIG. 4 is a flow chart illustrating example operations that can be performed to achieve selective driver coaching in accordance with one embodiment of the present disclosure. At operation 400, a deceleration event is detected. As discussed above, driver coaching data may include information such as a vehicle's deceleration, speed, location, travel route, etc. This information can be used to determine when the vehicle is approaching or operating within a deceleration event. This deceleration event may be an event that deceleration coaching circuit 102 wishes to control after a learning process as described above.

At operation 402, driver deceleration and reacceleration energies are measured. As described above, deceleration and reacceleration energies may be measured directly by one or more sensors of a vehicle, e.g., one or more of sensors 52 of vehicle 10. In other embodiments one or more of sensors 52 may provide information regarding operating characteristics of vehicle 10 from which the deceleration and reacceleration energies can be calculated or otherwise derived. For example, the amount of battery power and/or fuel consumed during deceleration and reacceleration can be determined. This may be used as a direct measurement of operating efficiency. In other embodiments, this consumption of energies may be used as a function of the distance traversed during the periods of deceleration and reacceleration to determine operating efficiency. It should be understood that while some examples of measuring operating efficiency have been disclosed herein, other methods of determining operating efficiency would be known to those of ordinary skill in the art, and are contemplated herein. The measured operating efficiency may also be included as a part of driver coaching data.

At operation 404, the energy savings due to driver-coached operation are estimated. That is, as described above, driver coaching circuit 102 can estimate, based on learning the deceleration characteristics associated with a deceleration event the amount of energy that can be saved. For example, driver coaching circuit 102 can determine how long a deceleration event lasts based on when a driver starts to decelerate on his/her own and when the driver begins to reaccelerate and when the driver typically reaches a constant, cruising speed. Depending on how much energy can be recouped through regenerative braking, and how much energy is estimated to be needed to reaccelerate, the operating efficiency based on driver-coached operation can be determined. Again, this estimated driver-coached operating efficiency may be a part of driver coaching data.

At operation 406, the respective operating efficiencies, sensor or sensor-based information, or other learned or calculated data (i.e., driver coaching data) can be stored, e.g., in memory 106 (FIG. 1B). It should be noted that this information may be alternatively (or additionally) stored remotely, e.g., on a remote server, cloud-based storage system, and the like and accessed by a vehicle as needed/upon completion of a learning phase. For example, local, in-vehicle processing may not be as fast or powerful as a dedicated processor. Accordingly, learned information may be stored and processed remotely, where the results of processing, e.g., a determination of operating efficiency, a determination of whether or not to apply driver coaching may be relayed to the vehicle.

When the driver coaching data is to be shared, that data may be transferred to another datastore at operation 407. This other datastore may be accessible by other vehicles, such as vehicles belonging to a fleet, or any other vehicles that might benefit from this data as noted previously. In this way, other vehicles may take advantage of driver coaching without having to learn some or all of the characteristics of a deceleration event. For example, one or more vehicles in a fleet of vehicles can access the driver coaching data so that when those vehicles encounter the same deceleration event, they can benefit from the increase in operating efficiency.

As previously discussed, the location and corresponding deceleration/reacceleration associated with that location can be stored. This information can be used to learn the characteristics of a particular deceleration event and location over time. Hence, at operation 408, it is determined whether or not the learning process or phase has been completed. In one embodiment, five instances of a deceleration event may be required before driver coaching circuit 102 begins providing driver coaching advice, e.g., coaching cues, and before driver coaching circuit 102 instructs electronic control unit 50 to implement regenerative braking. Thus, operations 400-406 may be repeated. It should be understood that the number of instances required in order to deem that sufficient information regarding a location and/or deceleration has been collected upon which driver coaching can be based may vary. For example, if information regarding a particular location or deceleration event is irregular or reflects large variations, an extended learning phase may be used by driver coaching circuit 102. Moreover, the number of instances can be reduced, as described above, when a vehicle relies on driver coaching data learned or derived by another vehicle.

At operation 409, coaching cues may be generated. In some embodiments, a driver coaching system may generate cues for presentation to a driver. In some embodiments, the presentation of such coaching cues may be contingent upon the comparison of operating efficiency (see below).

At operation 410, driver-controlled energy savings may be calculated. As described above, the operating efficiency associated with operating a vehicle without driver coaching can be determined based on the driver's deceleration and reacceleration characteristics at a particular location or deceleration event. As also previously described above, driver coaching circuit 102 may obtain this information while in its learning phase (despite in some embodiments, basing driver coaching on deceleration alone). For example, a driver coaching system can be augmented with the selective driver coaching functionality in some embodiments. In other embodiments, the driver coaching system may incorporate selective driver coaching as part of its operation. In some embodiments the operating efficiency may be an average operating efficiency. In some embodiments, the operating efficiency information or data may be weighted, normalized through multipliers, etc.

At operation 412, a comparison is made between driver energy savings, e.g., driver-controller operating efficiency, and driver-coached energy savings, e.g., driver-coached operating efficiency. If the driver-controlled operating efficiency is determined to exceed that of the driver-coached operating efficiency, the driver coaching system can be overridden at operation 416. Again, in some embodiments, selective driver coaching is used to augment an existing driver coaching system, necessitating overriding the existing driver coaching system. In other embodiments, where selective driver coaching is already implemented, driver coaching circuit 102 may simply not generate driver coaching advice based on such a determination. If on the other hand, the operating efficiency based on driver-coached operation of a vehicles is better, the driver coaching system may be used at operation 414. That is, driver coaching advice, e.g., coaching cues, can be generated and provided to the driver.

It should be noted that in some embodiments, data or information characterizing a driving (e.g., deceleration and reacceleration) event and corresponding location can be obtained and stored regardless of whether or not it may be used. In some embodiments this data or information can be maintained in the event that the driver's method of operating a vehicle become less efficient, or if a vehicle is operated by another driver. In this case, the amount of learning required may be lessened due to data or information characterizing the driving event and location already exist. For example, an abbreviated learning phase may be implemented or the existing data or information may simply require fine-tuning before being used to coach a driver, used to compare with driver-controlled operating efficiency, etc.

Figure 5A:
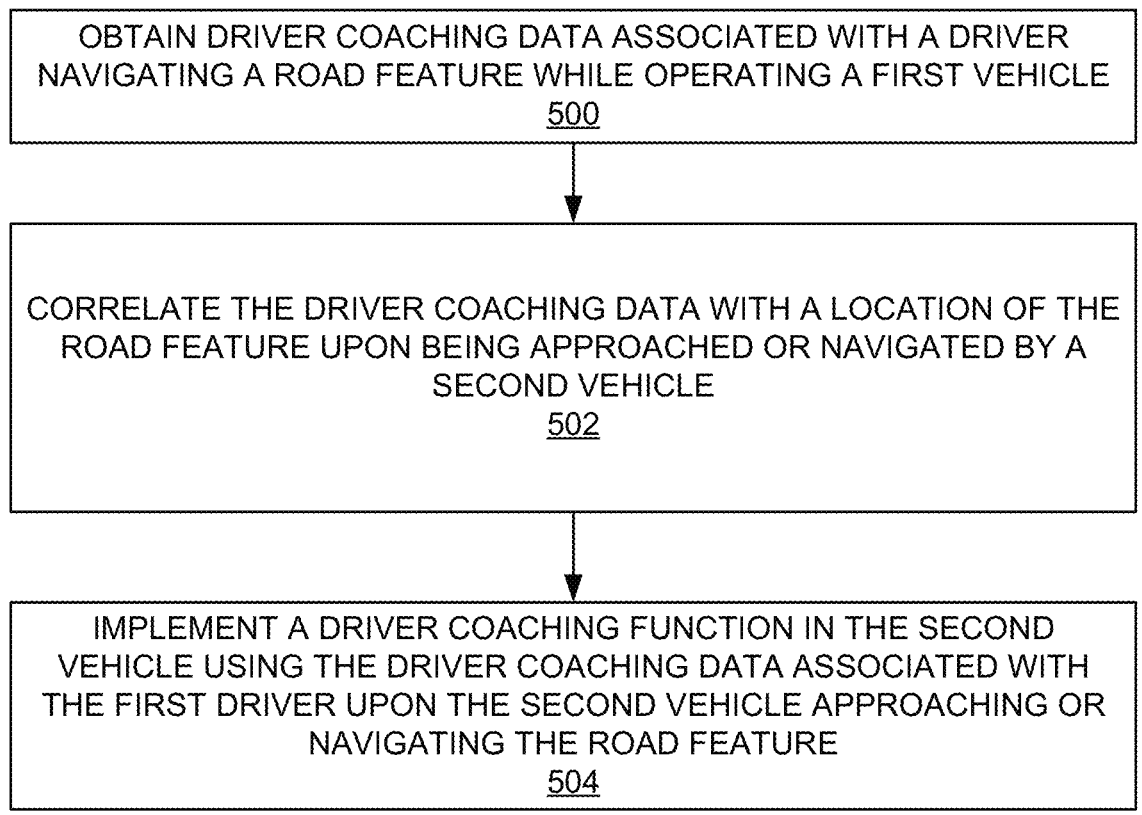
FIG. 5A is a flow chart illustrating example operations that can be performed to achieve the sharing of driver coaching data in accordance with one embodiment of the present disclosure.

FIG. 5A is a flow chart illustrating example operations that can be performed for sharing driver coaching data in accordance with one embodiment. At operation 500, driver coaching data associated with a driver navigating a road feature while operating a first vehicle is obtained. As previously discussed, a driver coaching system may learn the characteristics of a road feature, location, and the manner in which a driver navigates the road feature to determine, e.g., an optimal time to begin coasting and applying regenerative braking. For example, a deceleration event is detected approaching a turn. As discussed above, driver coaching data may include information such as a vehicle's deceleration, speed, location, travel route, etc. This information can be used to determine when the vehicle is approaching or operating within a deceleration event. This deceleration event may be an event that driver coaching circuit 102 wishes to control after a learning process as described above. The driver coaching data may be obtained from a central data store, directly from the first vehicle, through an intermediary network element, such as a roadside unit that is also in communication with the first vehicle, etc. For example, the first vehicle may transmit driver coaching data to any roadside unit near the road feature for the benefit of other vehicles traversing the same road feature.

At operation 502, the driver coaching data is correlated with a location of the road feature upon being approached or navigated by a second vehicle. That is, the driver coaching data that was obtained may be analyzed or searched for identifying information, such as location information. In this way, the appropriate driver coaching data may be applied or utilized. For example, driver coaching data that has been obtained may comprise information that applies to more than one road feature and/or location. In other embodiments, e.g., when driver coaching data is obtained from a roadside unit near the location of the road feature, operations 502 and 500 may be performed in the opposite order. For example, the location of the second vehicle may be detected or determined and that location information may be used to obtain the appropriate driver coaching data from the roadside unit.

At operation 504, a driver coaching function is implemented in the second vehicle using the driver coaching data associated with the first driver upon the second vehicle approaching or navigating the road feature. In some embodiments, implementation of the driver coaching function may refer to using the driver coaching data to generate coaching cues. In some embodiments, implementation of the driver coaching function may refer to the selective use of the driver coaching function based on driver-controlled operating efficiency. It should be understood that, as previously described, the use of driver coaching data can be more immediate in some embodiments. For example, the second vehicle may use the driver coaching data upon nearing the road feature, where the driver coaching data was obtained as the first vehicle navigated the road feature just ahead of the second vehicle. In other embodiments, the driver coaching data from the first vehicle may have been stored well before the second vehicle begins navigating the road feature.

Figure 5B:
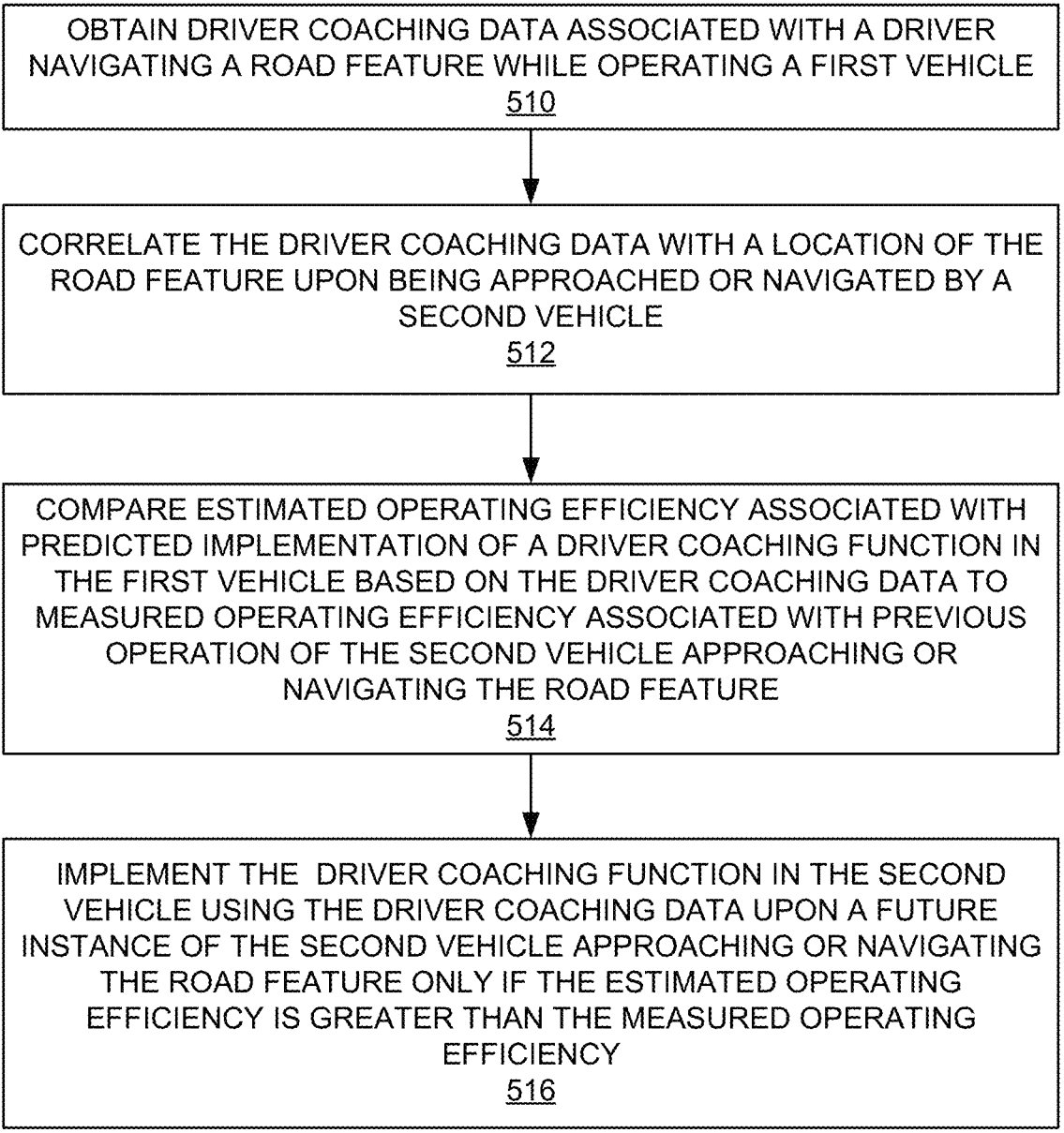
FIG. 5B is a flow chart illustrating example operations that can be performed to achieve the sharing of driver coaching data in accordance with one embodiment of the present disclosure.

FIG. 5B is a flow chart illustrating example operations that can be performed for sharing driver coaching data in accordance with one embodiment. At operation 510, driver coaching data associated with a driver navigating a road feature while operating a first vehicle is obtained. This operation may be similar to operation 500 of FIG. 5A.

At operation 512, the driver coaching data is correlated with a location of the road feature upon being approached or navigated by a second vehicle. This operation may be similar to operation 502 of FIG. 5A.

At operation 514, the estimated operating efficiency associated with a predicted implementation of a driver coaching function in the first vehicle based on the driver coaching data is compared to measured operating efficiency associated with a previous operation of the second vehicle approaching or navigating the road feature. As previously discussed, driver deceleration and reacceleration energies can be measured. Here, the driver deceleration and reacceleration energies are those of the second vehicle, e.g., vehicle 130 of FIG. 1B, while the estimated operating efficiency is that of vehicle 10 (based on the driver coaching data associated with vehicle 10). Accordingly, vehicle 130 need not necessarily engage in a learning process on its own before determining whether or not to provide coaching cues to its driver. Deceleration and reacceleration energies may be measured directly by one or more sensors of a vehicle, e.g., one or more of sensors of vehicle 130. In other embodiments one or more of sensors may provide information regarding operating characteristics of vehicle 130 from which the deceleration and reacceleration energies can be calculated or otherwise derived. For example, the amount of battery power and/or fuel consumed during deceleration and reacceleration can be determined. This may be used as a direct measurement of operating efficiency. In other embodiments, this consumption of energies may be used as a function of the distance traversed during the periods of deceleration and reacceleration to determine operating efficiency. It should be understood that while some examples of measuring operating efficiency have been disclosed herein, other methods of determining operating efficiency would be known to those of ordinary skill in the art, and are contemplated herein. The measured operating efficiency may also be included as a part of driver coaching data.

Regarding the estimated operating efficiency, e.g., of vehicle 10, driver coaching circuit 102 can determine how long a deceleration event lasts based on when a driver starts to decelerate on his/her own. This can also be based on when the driver begins to reaccelerate, and when the driver typically reaches a constant, cruising speed. Depending on how much energy can be recouped through regenerative braking, and how much energy is estimated to be needed to reaccelerate, the operating efficiency based on driver-coached operation can be determined.

At operation 516, the driver coaching function in the second vehicle using the driver coaching data upon a future instance of the second vehicle approaching or navigating the road feature only if the estimated efficiency is greater than the measured operating efficiency. In this embodiment, selective driver coaching may be implemented. However, as noted above, the determination as to whether or not coaching cues will be generated and/or presented (or whether the driver coaching function will be disabled, e.g., temporarily), does not only apply to a single vehicle. Rather, another vehicle, e.g., vehicle 130, may leverage the driver coaching data learned/derived by vehicle 10 in order to determine whether it will enable the driver coaching function. In this way, vehicle 130 can avoid undergoing its own learning process.

Figure 5C:
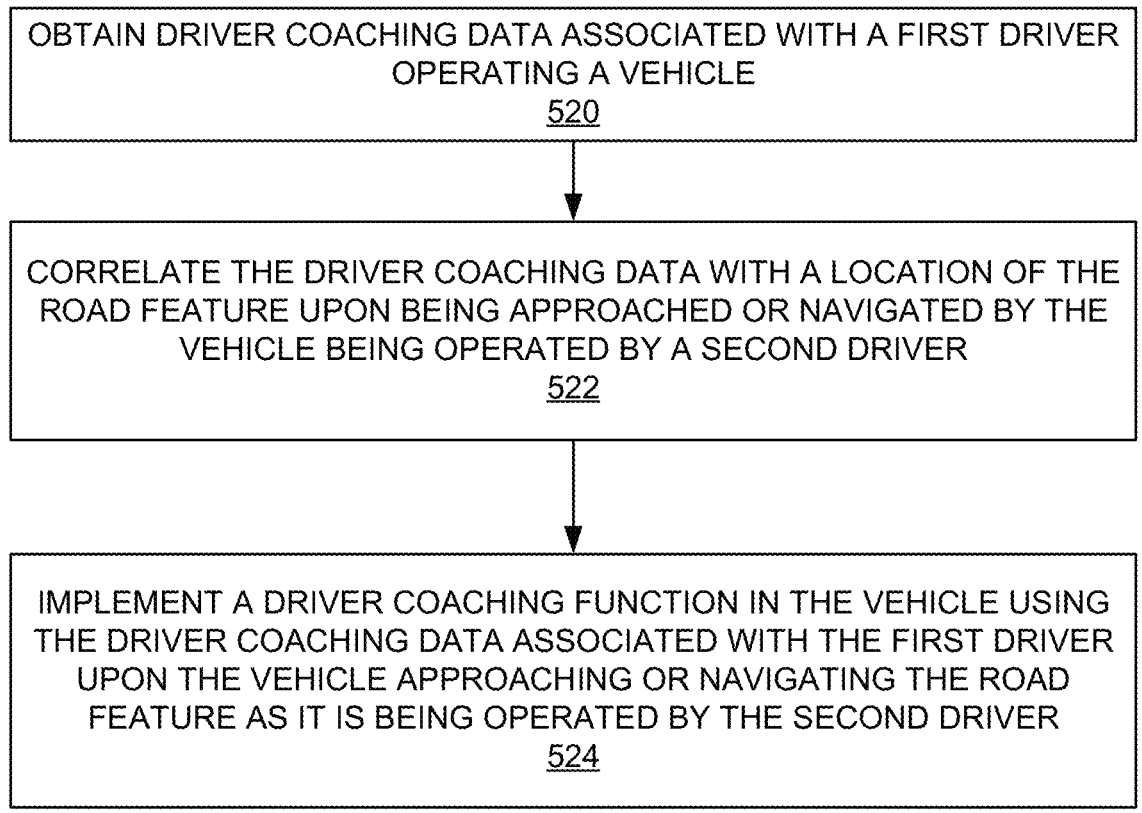
FIG. 5C is a flow chart illustrating example operations that can be performed to achieve the sharing of driver coaching data in accordance with one embodiment of the present disclosure.

FIG. 5C is a flow chart illustrating example operations that can be performed for sharing driver coaching data in accordance with one embodiment. At operation 520, driver coaching data associated with a first driver operating a vehicle is obtained. This operation may be similar to operation 500 of FIG. 5A.

At operation 522, the driver coaching data is correlated with a location of the road feature upon being approached or navigated by the vehicle being operated by a second driver. This operation may be similar to operation 502 of FIG. 5A. However, this embodiment reflects a scenario in which the same vehicle is being used by two different drivers at different times. For example, different family members may share a vehicle. In this case, there may not necessarily be a need to re-learn driver coaching data, e.g., road features, location information, driver-coached operating efficiency unless necessary. For example, if the second driver may agree to allow the driver coaching data that is collected/learned based on the first driver's operating of the vehicle to be used despite the second driver being in control of the vehicle.

At operation 524, a driver coaching function in the vehicle is implemented using the driver coaching data associated with the first driver upon the vehicle approaching or navigating the road feature as it is being operated by the second driver.

Although various embodiments described and/or illustrated in the present disclosure are directed to driver coaching, the sharing of data leading to or resulting from other types of energy-saving/energy-efficient measures is contemplated. For example, some systems, e.g., that described in commonly assigned U.S. patent application Ser. No. 15/615,803, are directed to using navigation information to optimize battery SOC. Other systems may use navigation routes input by a user to determine and map out the most efficient way to traverse the route by switching between EV and HEV modes of operation. Data obtained from or derived by such systems can also be shared with other drivers and/or vehicles to obtain the same or similar advantages.

Figure 6:
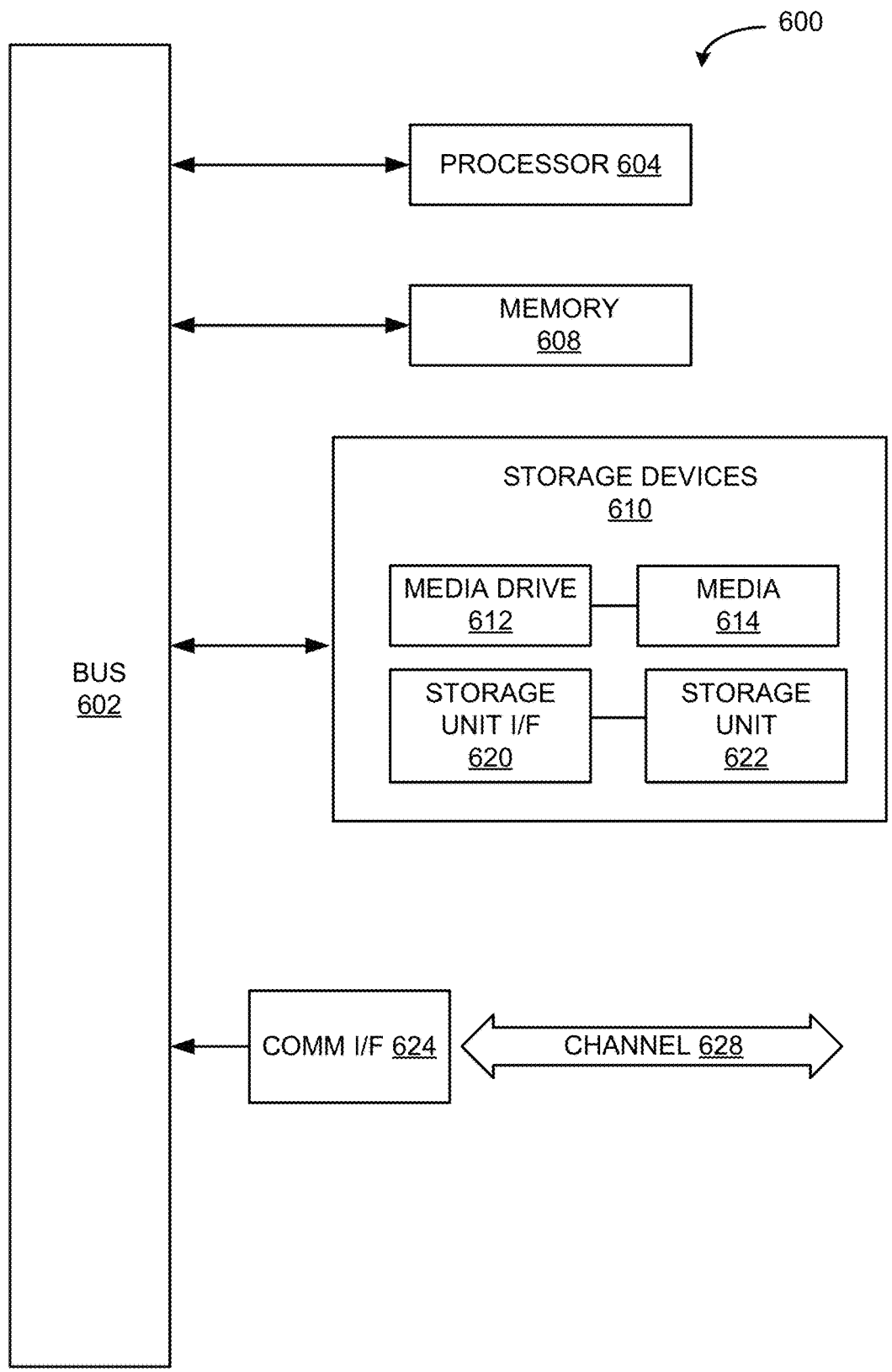
FIG. 6 illustrates an example computing system that may be used in implementing various features of embodiments of the disclosed technology.

As used herein, a circuit might be implemented utilizing any form of hardware, software, or a combination thereof. For example, one or more processors, controllers, ASICs, PLAs, PALs, CPLDs, FPGAs, logical elements, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 6. Various embodiments are described in terms of this example—computing system 600. After reading this description, it will become apparent to a person skilled in the relevant art how to implement the technology using other computing systems or architectures.

Referring now to FIG. 6, computing system 600 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment, such as for example, one or more of the elements or circuits illustrated in FIGS. 1A and 1B and described herein. Computing system 600 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 600 might include, for example, one or more processors, controllers, control modules, or other processing devices, such as a processor 604. Processor 604 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 604 is connected to a bus 602, although any communication medium can be used to facilitate interaction with other components of computing system 600 or to communicate externally.

Computing system 600 might also include one or more memory modules, simply referred to herein as main memory 608. For example, in some embodiments random access memory (RAM) or other dynamic memory, might be used for storing information and instructions to be executed by processor 604. Main memory 608 might also be used for storing temporary variables or other intermediate information during execution of instructions to be executed by processor 604. Computing system 600 might likewise include a read only memory ("ROM") or other static storage device coupled to bus 602 for storing static information and instructions for processor 604.

The computing system 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), a flash drive, or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing system 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a flash drive and associated slot (for example, a USB drive), a PCMCIA slot and card, and other fixed or removable storage units 622 and interfaces 620 that allow software and data to be transferred from the storage unit 622 to computing system 600.

Computing system 600 might also include a communications interface 624. Communications interface 624 might be used to allow software and data to be transferred between computing system 600 and external devices. Examples of communications interface 624 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 600 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "circuit," "component," or "element" does not imply that the aspects or functionality described or claimed as part of the that circuit, component, or element are all configured in a common package. Indeed, any or all of the various aspects or functionality of a circuit, component, or element, whether control logic or other aspect, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
    obtaining driver coaching data associated with a first driver navigating a road feature while operating a first vehicle;
    correlating the driver coaching data with a location of the road feature upon being approached or navigated by a second vehicle; and
    implementing a driver coaching function in the second vehicle using the driver coaching data associated with the first driver upon the second vehicle approaching or navigating the road feature, and
    wherein the obtaining of the driver coaching data comprises downloading the driver coaching data from a cloud-based datastore, downloading the driver coaching data from a fleet datastore, the first and second vehicles belonging to the same fleet, and receiving the driver coaching data from a memory unit of the first vehicle, wherein the driver coaching data is directly received from the memory unit or received from an intermediate.

2. The computer-implemented method of claim 1, wherein the driver coaching data comprises at least one of data characterizing the road feature, data identifying the location of the road feature, the driver's operation of the first vehicle at the location, and estimated operating efficiency associated with future implementation of the driver coaching function based on the driver coaching data.

3. The computer-implemented method of claim 2, wherein the future implementation of the driver coaching function based on the driver coaching data comprises implementing a maximum possible amount of regenerative braking during a deceleration aspect of navigating the road feature.

4. The computer-implemented method of claim 1, wherein the driver operating the first vehicle is the same as that operating the second vehicle.

5. The computer-implemented method of claim 1, wherein the driver operating the first vehicle is different from a driver operating the second vehicle.

6. The computer-implemented method of claim 1, wherein the implementation of the driver coaching function in the second vehicle comprises presenting one or more coaching cues to a driver operating the second vehicle suggesting release of the second vehicle's accelerator pedal to begin coasting.

7. The computer-implemented method of claim 1, wherein the implementation of the driver coaching function in the second vehicle comprises presenting one or more coaching cues to a driver operating the second vehicle suggesting release of the second vehicle's accelerator pedal to begin coasting.

8. A computer-implemented method, comprising:
    obtaining driver coaching data associated with a driver navigating a road feature while operating a first vehicle;
    correlating the driver coaching data with a location of the road feature upon being approached or navigated by a second vehicle;
    comparing estimated operating efficiency associated with predicted implementation of a driver coaching function in the first vehicle based on the driver coaching data to measured operating efficiency associated with previous operation of the second vehicle approaching or navigating the road feature; and
    implementing the driver coaching function in the second vehicle using the driver coaching data upon a future instance of the second vehicle approaching or navigating the road feature only if the estimated efficiency of the first vehicle is greater than the measured operating efficiency of the second vehicle.

9. The computer-implemented method of claim 8, wherein the predicted implementation of the driver coaching function based on the driver coaching data includes predicted implementation of a maximum possible amount of regenerative braking during one or more portions of the road feature where deceleration is needed.

10. The computer-implemented method of claim 9, wherein the implementation of the driver coaching function in the second vehicle comprises presenting one or more coaching cues suggesting a release of the second vehicle's accelerator pedal to induce coasting at which time the regenerative braking is initiated.

11. The computer-implemented method of claim 8, wherein the measured operating efficiency associated with the previous operation of the second vehicle is based on portions of the road feature during which deceleration and acceleration are needed.

12. The computer-implemented method of claim 11, wherein regenerative braking is not applied during the portions of deceleration.

13. The computer-implemented method of claim 8, further comprising one of temporarily disabling the driver coaching function, and overriding the driver coaching function upon a determination that the measured operating efficiency of the second vehicle is greater that the estimated operating efficiency of the first vehicle.

14. The computer-implemented method of claim 13, wherein the temporary disabling of the driver coaching function comprises temporarily disabling at least one of information collection and derivation, the collected and derived information comprising the driver coaching data.

15. The computer-implemented method of claim 13, wherein the overriding of the driver coaching function comprises prohibiting presentation of coaching cues.

16. The computer-implemented method of claim 8, wherein the implementation of the driver coaching function in the second vehicle comprises normalizing the driver coaching data for use with the second vehicle.

17. The computer-implemented method of claim 8, wherein the implementation of the driver coaching function in the second vehicle comprises normalizing the driver coaching data for use with the second vehicle, and wherein the driver coaching data comprises information characterizing a preferred distance from the road feature at which to begin coasting.

18. A computer-implemented method, comprising:
obtaining driver coaching data associated with a first driver operating a vehicle, wherein the driver coaching data comprises an estimated operating efficiency associated with a future implementation of the driver coaching function;
correlating the driver coaching data with a location of the road feature upon being approached or navigated by the vehicle as it is being operated by a second driver; and
implementing a driver coaching function in the vehicle using the driver coaching data associated with the first driver upon the vehicle approaching or navigating the road feature as it is being operated by the second driver, wherein the driver coaching function is implemented based on the estimated operating efficiency such that a maximum possible amount of regenerative braking during the deceleration aspect of navigating the road feature is implemented.

19. The computer-implemented method of claim 18, wherein the driver coaching data associated with the first driver is maintained as a driver coaching data profile retrievable by the first or second driver.

* * * * *